US011997643B2

(12) United States Patent
Shih et al.

(10) Patent No.: US 11,997,643 B2
(45) Date of Patent: May 28, 2024

(54) METHOD AND APPARATUS FOR PERFORMING PAGING MONITORING IN RADIO ACCESS NETWORKS

(71) Applicant: FG Innovation Company Limited, Tuen Mun (HK)

(72) Inventors: Mei-Ju Shih, Taipei (TW); Hung-Chen Chen, Taipei (TW); Yung-Lan Tseng, Taipei (TW); Chie-Ming Chou, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 336 days.

(21) Appl. No.: 17/599,737

(22) PCT Filed: Feb. 25, 2020

(86) PCT No.: PCT/CN2020/076647
§ 371 (c)(1),
(2) Date: Sep. 29, 2021

(87) PCT Pub. No.: WO2020/199794
PCT Pub. Date: Oct. 8, 2020

(65) Prior Publication Data
US 2022/0159617 A1 May 19, 2022

Related U.S. Application Data

(60) Provisional application No. 62/829,223, filed on Apr. 4, 2019.

(51) Int. Cl.
*H04W 68/02* (2009.01)
*H04W 68/00* (2009.01)
(Continued)

(52) U.S. Cl.
CPC .......... *H04W 68/02* (2013.01); *H04W 68/005* (2013.01); *H04W 76/27* (2018.02); *H04W 88/06* (2013.01)

(58) Field of Classification Search
CPC ... H04W 68/02; H04W 76/27; H04W 68/005; H04W 88/06
See application file for complete search history.

(56) References Cited

U.S. PATENT DOCUMENTS

| 2012/0282982 | A1 | 11/2012 | Mujtaba et al. |
| 2014/0135014 | A1 | 5/2014 | Li |
| 2020/0245390 | A1* | 7/2020 | Ali .................... H04W 36/0069 |

FOREIGN PATENT DOCUMENTS

| CN | 103228015 | 7/2013 |
| CN | 109246803 | 1/2019 |

OTHER PUBLICATIONS

Huawei, HiSilicon, Discussion to clarify the relationship between OSI monitor occasion and SSB,3GPP TSG-RAN WG2 Meeting #103bis, Chengdu, China, Oct. 8-12, 2018, R2-1815069, the whole document.

* cited by examiner

*Primary Examiner* — Curtis B Odom
(74) *Attorney, Agent, or Firm* — ScienBiziP, P.C.

(57) ABSTRACT

A method and an apparatus for paging monitoring are provided. The method is performed by a user equipment and includes receiving a first paging configuration associated with a first radio access network, receiving a second paging configuration associated with a second radio access network from the first radio access network, monitoring at least one first paging occasion for the first radio access network based on the first paging configuration received from the first radio access network, and monitoring at least one second paging occasion for the second radio access network based on the (Continued)

second paging configuration received from the first radio access network, when the UE switches from a first cell of the first radio access network to camp on a second cell of the second radio access network.

20 Claims, 8 Drawing Sheets

(51) Int. Cl.
  *H04W 76/27* (2018.01)
  *H04W 88/06* (2009.01)

METHOD AND APPARATUS FOR PERFORMING PAGING MONITORING IN RADIO ACCESS NETWORKS

CROSS-REFERENCE TO RELATED APPLICATION(S)

The present application claims the benefit of and priority to U.S. Provisional Patent Application Ser. No. 62/829,223, filed on Apr. 4, 2019, entitled "Method and Apparatus on Paging Monitoring and Configuration in DRX and DRS on the Unlicensed Spectrum," with, the content of which is hereby incorporated herein fully by reference into the present application.

FIELD

The present disclosure generally relates to wireless communications, and more particularly, to methods and apparatuses for performing paging monitoring in Radio Access Networks (RANs).

BACKGROUND

Paging is a mechanism that allows a network to reach User Equipments (UEs) operating in the Radio Resource Control (RRC)_IDLE state and the RRC_INACTIVE state, and to notify UEs operating in the RRC_IDLE state, the RRC_INACTIVE state or the RRC_CONNECTED state of system information changes and/or Public Warning System (PWS) indications (e.g., Earthquake and Tsunami Warning System (ETWS)/Commercial Mobile Alert System (CMAS) messages).

However, the paging mechanism in current wireless communication systems may not be adequate for UEs operating among multiple RANs.

Therefore, there is a need in the art for paging enhancement in the wireless communication systems.

SUMMARY

The present disclosure is directed to methods and apparatuses for performing paging monitoring in RAN(s).

According to an aspect of the present application, a UE for paging monitoring is provided. The UE includes one or more non-transitory computer-readable media having computer-executable instructions embodied thereon and at least one processor coupled to the one or more non-transitory computer-readable media. The at least one processor is configured to execute the computer-executable instructions to receive a first paging configuration associated with a first RAN, receive a second paging configuration associated with a second RAN from the first RAN, monitor at least one first Paging Occasion (PO) for the first RAN based on the first paging configuration received from the first RAN, monitor at least one second PO for the second RAN based on the second paging configuration received from the first RAN when the UE switches from a first cell of the first RAN to camp on a second cell of the second RAN, and perform at least one updating procedure comprising: updating the second paging configuration based on first dedicated signaling received from the second cell of the second RAN or based on first system information received from the second cell of the second RAN, after the UE switches to camp on the second cell of the second RAN; updating the second paging configuration based on second dedicated signaling received from the first cell of the first RAN or based on second system information received from the first cell of the first RAN, before the UE switches to camp on the second cell of the second RAN; and updating the first paging configuration based on third dedicated signaling received from the second cell of the second RAN or based on third system information received from the second cell of the second RAN, after the UE switches to camp on the second cell of the second RAN.

According to another aspect of the present application, a method performed by a UE for paging monitoring is provided. The method includes receiving a first paging configuration associated with a first RAN, receiving a second paging configuration associated with a second RAN from the first RAN, monitoring at least one first PO for the first RAN based on the first paging configuration received from the first RAN, monitoring at least one second PO for the second RAN based on the second paging configuration received from the first RAN, when the UE switches from a first cell of the first RAN to camp on a second cell of the second RAN, and perform at least one updating procedure comprising: updating the second paging configuration based on a first dedicated signaling received from the second cell of the second RAN or based on a first system information received from the second cell of the second RAN, after the UE switches to camp on the second cell of the second RAN; updating the second paging configuration based on a second dedicated signaling received from the first cell of the first RAN or based on a second system information received from the first cell of the first RAN, before the UE switches to camp on the second cell of the second RAN; and updating the first paging configuration based on a third dedicated signaling received from the second cell of the second RAN or based on a third system information received from the second cell of the second RAN, after the UE switches to camp on the second cell of the second RAN.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
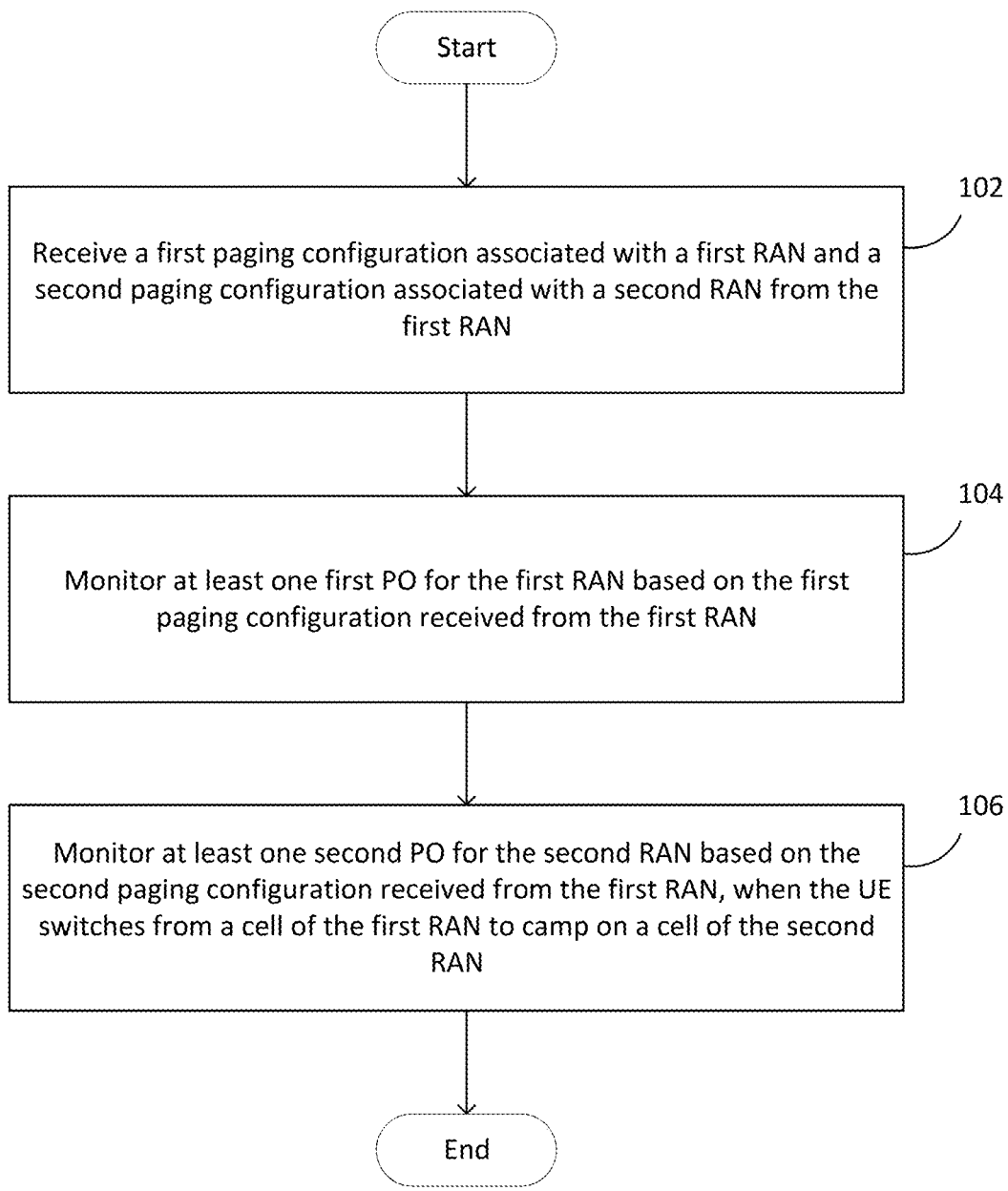
FIG. 1 is a schematic diagram illustrating a flowchart for a method of performing a paging monitoring procedure in RANs, in accordance with an example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G New Radio (NR) RAN typically includes at least one Base Station (BS), at least one UE, and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a 5G Core (5GC), or an internet), through a RAN established by one or more BSs.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A BS may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE, e.g., LTE connected to a 5GC), NR (often referred to as 5G), and/or LTE-A Pro. However, the scope of the present application should not be limited to the above-mentioned protocols.

A BS may include, but is not limited to, a node B (NB) as in the UMTS, an evolved Node B (eNB) as in the LTE or LTE-A, a Radio Network Controller (RNC) as in the UMTS, a Base Station Controller (BSC) as in the GSM/GERAN, a ng-eNB as in an Evolved Universal Terrestrial Radio Access (E-UTRA) BS in connection with the 5GC, a next generation Node B (gNB) as in the 5G-RAN, and any other apparatus capable of controlling radio communication and managing radio resources within a cell. The BS may serve one or more UEs through a radio interface.

The BS may be operable to provide radio coverage to a specific geographical area using a plurality of cells being included in the RAN. The BS supports the operations of the cells. Each cell may be operable to provide services to at least one UE within its radio coverage. More specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmissions). The BS can communicate with one or more UEs in the radio communication system through the plurality of cells. A cell may allocate Sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in the $3^{rd}$ Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval of a single NR frame, a DL transmission data, a guard period, and an UL transmission data should at least be included, where the respective portions of the DL transmission data, the guard period, the UL transmission data should also be configurable, for example, based on the network dynamics of NR. In addition, SL resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

For the radio access technology deployed on the unlicensed spectrum, devices (e.g., UE, BS, and Access Point (AP)) may follow Listen Before Talk (LBT) mechanism before accessing a channel. The device(s) may perform Clear Channel Assessment (CCA) before performing transmissions on an unlicensed channel. If LBT fails, the device(s) may not access the channel at a determined time.

NR-based unlicensed access (e.g., NR-U) design may also need to take the LBT mechanism into consideration. The deployment scenarios of the NR-based unlicensed access may be but not limited to:

Carrier Aggregation (CA) between the licensed band NR (e.g., for a Primary Cell (PCell)) and the NR-U (e.g., for a Secondary Cell (SCell)). In one implementation, an NR PCell may be connected to a 5GC.

NR-U SCell may have both DL and UL, or DL-only.

Dual Connectivity (DC) between the licensed band LTE (e.g., for a PCell) and the NR-U (e.g., for a Primary SCG Cell (PSCell)), where SCG means a secondary cell group. In one implementation, an LTE PCell may be connected to an EPC or a 5GC.

Stand-alone NR-U. In one implementation, an NR-U PCell may be connected to a 5GC.

An NR cell with a DL in the unlicensed band and a UL in the licensed band. In one implementation, an NR-U PCell may be connected to a 5GC.

DC between the licensed band NR (e.g., for a PCell) and the NR-U (e.g., for a PSCell). In one implementation, an NR PCell may be connected to a 5GC.

Among the deployment scenarios, paging enhancement may be required at least in (but not limited to) the stand-alone NR-U case. In addition, based on the NR paging design, a UE may monitor one or more paging channels in a PO per Discontinuous Reception (DRX) cycle. However, the success rate of the paging transmission may be affected by LBT. For example, if LBT fails on an unlicensed spectrum (e.g., NR-U), and/or if the gNB/cell does not transmit paging Downlink Control Information (DCI) successfully in the PO for the UE, the latency for the UE to successfully receive the paging messages from a gNB/cell may be increased. In addition, a UE operating in the RRC_IDLE state or in the RRC_INACTIVE state may not successfully receive the paging DCI in the determined PO(s) based on the current Paging Frame (PF) and PO formula.

In view of this, paging enhancement may be critical for unlicensed spectrum operations. For example, the increase of PO number per DRX cycle, the increase of PO number in a DRX cycle, and/or the increase of PO number out of a DRX cycle may be beneficial to a UE. The additional PO(s) may be in a DRX cycle and/or in a specific Reference Signal (RS) (e.g., a Discovery Reference Signal (DRS)). The UE may receive the PDCCH addressed to the Radio Network Temporary Identifier (RNTI) associated to paging in the (additional) PO(s). The UE may receive the paging message(s) in the Physical Downlink Shared Channel(s) (PDSCH(s)), which may be indicated by the PDCCH addressed to the RNTI associated with paging. The RNTI associated with paging may be the P-RNTI (Paging Radio Network Temporary Identifier). The RNNT associated to paging may be 16-bit in length. The value of RNTI associated with paging may be fixed to 65534 (0xFFFE).

A UE operating in the RRC_IDLE state (which is referred to as an "RRC_IDLE UE") or a UE operating in the RRC_INACTIVE state (which is referred to as an "RRC_I-NACTIVE UE") may receive the paging messages for mobile terminated data, which may be initiated or managed by the 5GC. In some implementations, the RRC_IDLE/RRC_INACTIVE UE may be configured with DRX by Non-Access Stratum (NAS) for receiving CN paging. In some implementations, the RRC_INACTIVE UE may receive the paging messages (e.g., RAN paging) from a Next-Generation Radio Access Network (NG-RAN). In some implementations, the RRC_INACTIVE UE may be configured with DRX by the NG-RAN for RAN paging. In some implementations, the NG-RAN may include an NG-RAN node, which may be either a gNB or an ng-eNB.

In some implementations, an RRC_IDLE/RRC_INAC-TIVE UE may not monitor paging channel(s) continuously. For example, the RRC_IDLE/RRC_INACITVE UE may monitor the paging channel(s) during one or multiple POs per DRX cycle. It is noted that a PO may be a set of PDCCH monitoring occasions and may include multiple time slots (e.g., subframe(s) or OFDM symbol(s)) where paging DCI can be sent by the BS. In some implementations, the value of the DRX cycle may be broadcast in system information for CN paging. For example, the value of the DRX cycle may be UE-specific, which is configured via NAS signaling for CN paging. In another example, the DRX cycle may be UE-specific, which is configured via RRC signaling for RAN paging. In some implementations, if a UE is configured with multiple values for the DRX cycle or multiple DRX cycle configurations, the UE may apply the shortest DRX cycle among the configured DRX cycles. In some implementations, an RRC_CONNECTED UE may monitor the paging channels in any PO signaled in system information. In some implementations, for an RRC_CONNECTED UE having an active Bandwidth Part (BWP) with a common search space configured to monitor the paging channel(s), the UE may monitor the system information (SI) change indication in any PO at least once in a modification period.

In some implementations, the Radio Link Control (RLC) entity of the UE may use a Transparent Mode (TM) for paging, which is one of multiple RLC transmission modes. In some implementations, for paging, the UE may use a logical channel (e.g., Paging Control Channel (PCCH)) between the RLC entity and Medium Access Control (MAC) entity of the UE. The PCCH may be a DL channel that is used for transferring paging information, system information change notifications and indications of ongoing PWS (e.g., ETWS or CMAS) from the network. For example, an RRC_IDLE/RRC_INACTIVE UE may receive the ETWS/CMAS indication(s) in its PO(s). On the other hand, an RRC_CONNECTED UE may receive the ETWS/CMAS indication(s) in any PO. If the UE receives a paging message (or short message, or PDCCH addressed to an RNTI associated with paging) that includes the ETWS/CMAS indication, the UE may trigger the acquisition of system information without delaying until the next modification period. It is noted that the PCCH may map to a Paging Channel (PCH), which is a transport channel between the MAC and Physical Layer (PHY) of the UE.

Paging procedures may be affected by LBT failure, resulting in reduced transmission opportunities for paging. In view of this, some mechanisms are provided for enhancing the paging opportunities. For example, in some implementations, mechanisms for increasing the time-domain POs (or paging monitoring occasions) are provided. In some implementations, additional PO(s) outside of a DRS (e.g., an NR-U DRS) may be applied. The NR-U DRS may refer to a contiguous burst including the Channel State Information-Reference Signal (CSI-RS) and the Remaining System Information-Control Resource Set(s) (RMSI-CORESET(s)), together with the PDSCH(s) (carrying the RMSI) associated with the Synchronization Signal/Physical Broadcast Channel Block(s) (SS/PBCH Block(s), SSB(s)), and the SS/PBCH burst set.

In some implementations, for an SSB transmission in the NR-U DRS, the CSI-RS, the RMSI-CORESET(s) and the RMSI-PDSCH(s) may be included in the same contiguous burst when the transmission of the CSI-RS/RMSI are configured. Optionally Other System Information (OSI) and paging may be transmitted in the same DRS if there are available resources.

In some implementations, the UE may determine the PO and PF per DRX cycle to monitor the paging channels based on the PF/PO formula. The BS may provide the required parameters used in the PF/PO formula to the UE. The UE may derive the location of the PO and PF per DRX cycle. In some implementations, the UE may derive one PO in one PF per DRX cycle and monitor the paging channel(s) in one PO per DRX cycle. In some implementations, the PF/PO formula(s) may be modified so that the UE may monitor the paging channel(s) in a DRX cycle more flexibly, i.e., the UE may not be restricted to monitor one PO in one PF per DRX cycle.

In addition, for paging, it may be beneficial to create more opportunities (e.g., time/frequency resources, paging channels, or POs) per DRX cycle for the UE to receive the paging message(s). In some implementations, the BS may configure one or more additional PO locations in the time domain by configuring an extended PO (e.g., a paging window) and/or configuring multiple POs to a UE. In some implementations, for any specified solution(s) for creating additional paging opportunities, the UE power consumption may also be taken into account; to this end, it may be beneficial that the POs are transmitted in close time to or overlap with the RSs.

In some implementations, the UE may monitor the paging channel(s) in a DRS based on the paging configuration. The UE may monitor the paging channel(s) in a DRX cycle based on the paging configuration used for the PF/PO formula calculation.

In some implementations, if the UE cannot decode the PDCCH for paging (e.g., the UE does not decode the PDCCH for paging successfully) in the determined PO(s) in a DRX cycle, the UE may continue monitoring the paging channel(s), either in PO(s) in the DRS or in PO(s) in the same DRX cycle. The PDDCH for paging may be the PDDCH addressed to an RNTI associated with paging.

In some implementations, if the UE cannot decode the PDCCH for paging in the determined PO(s) in a DRX cycle, the UE may continue monitoring the paging channel(s) in PO(s) in different DRX cycles.

In some implementations, if the UE cannot decode the PDCCH for paging in the determined PO(s) in a DRX cycle, the UE may start to monitor the paging channel(s) in PO(s) in the DRS. Meanwhile, the UE may also monitor the paging channel(s) in the determined PO(s) in the same DRX cycle.

In some implementations, if the UE cannot decode the PDCCH for paging in the determined PO(s) in a DRX cycle, the UE may skip monitoring the paging channel(s) in PO(s) in the same DRX cycle but continue monitoring the paging channel(s) in PO(s) in different DRX cycles.

In some implementations, if the UE cannot decode the PDCCH for paging in the determined PO(s) in a DRX cycle, the UE may wake up to monitor the paging channel(s) in PO(s) in the DRS and the paging channel(s) in the determined PO(s) in a DRX cycle. Such DRX cycle may be the same as or different from the DRX cycle in which the UE cannot decode the PDCCH for paging in the determined PO(s).

In some implementations, if the UE successfully decodes the PDCCH for paging in a PO in a DRS before the next determined PO in the same DRX cycle, the UE may skip monitoring the paging channel(s) in the following determined PO(s) in the same DRX cycle.

In some implementations, if the UE successfully decodes the PDCCH for paging in a PO in a DRX cycle, the UE may skip monitoring the paging channel(s) in the following determined PO(s) in the same DRX cycle.

In some implementations, if the UE successfully decodes the PDCCH for paging in one or more POs (which may be in a DRX cycle or in a DRS), the UE may stop monitoring the paging channel(s) in the PO(s) in the DRS, if the UE is configured to monitor the paging channel(s) in PO(s) in the DRS.

In some implementations, if the UE successfully decodes the PDCCH for paging in a PDCCH monitoring occasion for paging in a determined PO based on a PF/PO formula in a DRX cycle, the UE may not monitor the paging channel(s) in PO(s) in a DRS, where the PO(s) in the DRS may come after the determined PO but falls within the same DRX cycle.

In some implementations, before the UE successfully decodes the PDCCH for paging in a determined PO based on a PF/PO formula in a DRX cycle, the UE may monitor the paging channel(s) in a PO in the DRS.

In some implementations, the UE may receive an indication in a DRS from a serving/camped cell, indicating whether the UE needs to monitor the paging channel(s) outside the DRS. The indication may be carried in an RMSI, OSI, or paging DCI in a DRS. In some implementations, the indication may have a Boolean structure or an enumerate structure. For example, if the UE receives the indication that indicates the UE to monitor the paging channel(s) outside the DRS, the UE may monitor the paging channel(s) outside the DRS in the PO(s) calculated by the PF/PO formula. It is noted that the PF/PO formula may include any paging enhancement (e.g., a PF/PO formula considering at least one of: 1) multiple PFs in a DRX cycle, 2) multiple POs in one PF in a DRX cycle, 3) multiple beam sweep rounds in a PO, and 4) a paging monitoring window). The paging monitoring window may refer to a time duration, in which the UE performs the paging monitoring. The UE may receive the parameters from the BS, wherein the parameters are required for the UE to calculate the PF/PO formula. Based on the PF/PO formula, the UE may derive the time/frequency resources for the PDCCH monitoring occasions. The UE may monitor the PDDCH monitoring occasions for paging and receive (or decode) the PDCCH addressed to an RNTI associated with paging sent by the BS.

In some implementations, if the UE cannot decode the PDCCH for paging in the determined POs based on the PF/PO formula in a DRX cycle, the UE may enter the RRC_CONNECTED state. For example, the UE may send an RRC message (e.g., an RRC (Connection) Resume Request message or an RRC (Connection) Setup Request message) to the serving cell (e.g., if the UE is in an RRC_CONNECTED state), BS (e.g., a gNB) or the camped cell (e.g., if the UE is in an RRC_IDLE/RRC_INACTIVE state). The RRC message may include a cause value. For example, the cause value may indicate a 'PO failure'. In some implementations, the BS (e.g., a gNB) or serving cell may reply to the UE with new PF/PO parameters in an RRC message (e.g., an RRC Release message with a suspend configuration, an RRC Release message without a suspend configuration, an RRC Release message, an RRC Setup message or an RRC Reconfiguration message). The new PF/PO parameters may be used for increasing a paging monitoring window.

In some implementations, the BS (e.g., a gNB) or serving/camped cell may adjust the paging parameters and inform the UE of the parameter adjustment via system information (e.g., via System Information Block 1 (SIB1) and/or via OSI). The UE may apply the adjusted paging parameters in the system information to determine the updated PO(s), based on the PF/PO formula with the adjusted paging parameters, in a DRX cycle or in a DRS. The UE may therefore monitor the paging channel(s) in the PO(s), either in the DRS or in the DRX cycle, determined based on the adjusted paging parameters.

In some implementations, if the UE cannot decode the PDCCH for paging in the determined PO(s) based on the PF/PO formula in a DRX cycle, the UE may perform a cell reselection procedure to reselect a new cell to camp on.

In some implementations, if the UE cannot decode the PDCCH for paging in the determined PO(s) based on the PF/PO formula in a DRX cycle, the UE may bar itself from camping on the cell that transmits the paging message(s) (or the PDCCH for paging in the determined PO(s)). For example, when the UE performs the cell reselection procedure, the UE may bar itself from reselecting the cell that transmits the paging message(s) (or the PDCCH for paging in the determined PO(s)) to camp on. In some implementations, the barring time may be X seconds, where X is a positive real number. In some implementations, the UE may start a timer if the UE cannot decode the PDCCH for paging in the PO(s) determined based on the PF/PO formula in a DRX cycle. Within the X seconds (i.e., when the timer is running), the UE may not reselect to such a cell. Upon the timer expiry, the UE may reselect to such a cell or consider such a cell as a candidate cell for cell reselection. In other implementations, if the UE cannot decode the PDCCH for paging in the PO(s) determined based on the PF/PO formula in a DRX cycle, the UE may bar itself from camping on any cell on an unlicensed spectrum (e.g., NR-U), where the barring time may be X seconds.

In some implementations, if the UE cannot decode the PDCCH for paging in the determined PO(s) in a DRX cycle, the UE may report paging failure information to a cell. It is noted that such a cell may be an SCell, a reselected cell as the outcome of cell reselection procedure which the UE may perform after the UE cannot decode the PDCCH for paging in the determined PO(s) in a DRX cycle, a cell transmitting the PDCCH for paging, or a cell transmitting the paging message(s). In some implementations, the UE may report the paging failure information to an SCell (e.g., via Physical Uplink Control Channel (PUCCH) resources) if the UE is configured with CA. In some implementations, the UE may report the paging failure information to a PSCell (e.g., via PUCCH resources, via RRC signaling, via Signaling Radio Bearer 3 (SRB3), via PUSCH resources) in an SCG if the UE is configured with multi-connectivity. In some implementations, the UE may report the paging failure information to a reselected cell after performing cell reselection. In some implementations, if a cell (e.g., SCell, PSCell or reselected cell) receives the paging failure information, Xn/X2 interface signaling may be required for the cell to exchange/forward the DL data to the UE. In some implementations, the cell which the UE reports the paging failure information may (not) be the cell which configures the UE with parameters to derive the PO(s)/PF in the DRX cycle for paging monitoring. In some implementations, the cell which the UE reports the paging failure information may (not) be the cell from which the UE may decode or receive the PDCCH for paging.

In some implementations, the UE may simultaneously monitor the paging channel(s) in the determined PO(s) in a DRX cycle and monitor the paging channel(s) in PO(s) in DRS.

In some implementations, the UE may monitor the PDCCH for paging in determined PO(s), which falls within an Active Time of a DRX cycle. The Active Time may refer to the time duration when a DRX-related timer (e.g., drx-onDurationTimer, drx-InactivityTimer, drx-RetransmissionTimerDL or drx-RetransmissionTimerUL) is running. The UE may monitor the PDCCH for paging in PO(s) in a DRS in the non-Active Time of a DRX cycle. In some implementations, the paging monitoring in a DRS may not initiate the DRX-related timer (e.g., drx-InactivityTimer, drx-RetransmissionTimerDL or drx-RetransmissionTimerUL). The UE may wake up one shot for PDCCH monitoring for paging in the DRS and go back to the non-Active Time after the DRS reception.

In some implementations, in the Active Time of a DRX cycle, the UE may monitor the PDCCH occasion for paging in the PO(s) in a DRS, while in the non-Active Time of the DRX cycle, the UE may not monitor the PDCCH occasion for paging in the PO(s) in the DRS.

In some implementations, the Active Time may extend when one or more predetermined conditions are satisfied. The predetermined conditions may include, but not limited to, the detection of LBT failure, the detection of PDCCH decoding failure, and the channel occupancy ratio being above a threshold. In some implementations, the UE may be configured by the serving cell via RRC message(s) with a timer related to the predetermined condition(s). If the predetermined condition corresponding to the timer is satisfied (e.g., the channel occupancy ratio is above a threshold), the UE may extend or start the timer. In some implementations, if the UE fails to decode the PDCCH (e.g., the PDCCH for paging), the UE may extend or start the timer. When the timer is running, it may be deemed as the Active Time. In some implementations, if the timer expires but other DRX-related timers (e.g., drx-InactivityTimer, drx-RetransmissionTimerDL, and drx-RetransmissionTimerUL) are still running, the UE may be in the Active Time of a DRX cycle.

In some implementations, in Multi-Subscriber Identification Modules (Multi-SIM(s)) scenarios, the UE may be (pre)configured or installed with at least two UMTS Subscriber Identity Modules (USIM(s)). A USIM may be a physical SIM or an embedded-SIM (eSIM). The USIMs of a UE may belong to the same operator or belong to different operators. An operator may be a public network operator (e.g., Public Land Mobile Network (PLMN) operator), or a Non-Public Network (NPN) (e.g., a Standalone Non-public Network (SNPN) operator or a Public Network Integrated Non-Public Network (PNI-NPN) operator). The network of one USIM (e.g., the Network A) may be NR (connected to a 5GC), LTE connected to a 5GC, LTE connected to an EPC, and/or multi-connectivity (e.g., E-UTRA-NR (EN)-DC (EN-DC), NR-E-UTRA (NE)-DC (NE-DC), NG-RAN E-UTRA-NR (NGEN)-DC (NGEN-DC), and NR-DC), but not limited to. For example, a UE equipped with two USIMs may operate in a Network A and a Network B. Each of the Network A and the Network B may be a RAT (e.g., NR, or LTE connected to a 5GC, LTE connected to an EPC). The Network A and Network B may support the same RAT or support different RATs.

In some implementations, a Multi-SIM device (e.g., a Multi-SIM UE) may operate either in a Dual SIM Dual Standby (DSDS) mode or Dual SIM Dual Active (DSDA) mode, but not limited to.

DSDS: Both SIMs may be used for idle-mode network connection. However, when a radio connection is active, the second connection may be disabled. The SIMs in a DSDS device may share a single transceiver. Through time multiplexing, two radio connections may be maintained in the idle mode (e.g., the UE may be in the RRC_IDLE/RRC_INACTIVE state). When the UE is in-call on network for one SIM, it may be no longer possible to maintain the radio connection to the network of the second SIM. Hence, the connection to the network of the second SIM may be unavailable for the duration of the call. Registration to the second network may be maintained.

DSDA: Both SIMs may be used in both idle and connected modes. Each SIM may have a dedicated transceiver, meaning that there are no interdependencies on idle or connected mode operation at the modem level. In one implementation, the idle mode may refer to a scenario when the UE is in the RRC_IDLE or RRC_INACTIVE state. The connected mode may refer to a scenario when the UE is in the RRC_CONNECTED state.

Based on the device implementation choices, several architectures for multi-SIM devices may coexist in the market to support DSDS or DSDA, e.g., single Rx (Receiver (chain))/single TX (Transmitter (chain)), dual Rx/single TX and dual Rx/dual TX. A single Rx UE may not be capable of receiving traffic from two or more networks at the same time, while a dual Rx UE may be able to do so. On the other hand, a single TX UE may not be capable of transmitting traffic to two or more networks at the same time, while a dual TX UE may be able to do so.

In some implementations, the CN of the Network A may be the same as, or different from, the CN of the Network B. For example, considering an LTE network (e.g., an LTE RAN) connected to an EPC, the Network A may refer to the LTE RAN and the CN of the Network A may refer to the EPC. In another example, considering the NR case, the Network A may refer to an NR network (e.g., an NR RAN) and the CN of the Network A may refer to a 5GC. The UE may be equipped with a single-TX and a single-RX, a single-TX and a dual-RX, or a dual-TX and a dual-RX.

FIG. 1 is a schematic diagram illustrating a flowchart for a method of performing a paging monitoring procedure in RANs, in accordance with an example implementation of the present application.

In action 102, a UE may receive a first paging configuration associated with (a cell of) a first RAN (e.g., the Network A, which may be an LTE RAN or an NR RAN) and a second paging configuration associated with (a cell of) a second RAN (e.g., the Network B, which may be an LTE RAN or an NR RAN) from (a cell of) the first RAN. That is, (the cell of) the first RAN may provide its own paging configuration (e.g., the first paging configuration) and the paging configuration(s) (e.g., the second paging configuration) of (cells of) other RAN(s) to the UE. In some implementations, the UE may receive the first paging configuration and/or the second paging configuration via dedicated signaling (e.g., an RRC message, an RRC Reconfiguration message, an RRC Release message, an RRC Release message with a suspend configuration, or an RRC Release message without a suspend configuration).

In action 104, the UE may monitor at least one first PO for (the cell of) the first RAN based on the first paging configuration received from (the cell of) the first RAN. For example, the UE may receive one or more paging messages (or PDCCH for paging) from (the cell of) the first RAN by monitoring the first PO(s) based on the first paging configuration.

In action 106, the UE may monitor at least one second PO for (the cell of) the second RAN based on the second paging configuration received from (the cell of) the first RAN, when the UE switches from a cell of the first RAN to camp on a cell of the second RAN. For example, once the UE switches to camp on the cell of the second RAN, the UE may receive one or more paging messages (or PDCCH for paging) from (the cell of) the second RAN by monitoring the second PO(s) based on the second paging configuration received from the first RAN.

Figure 2:
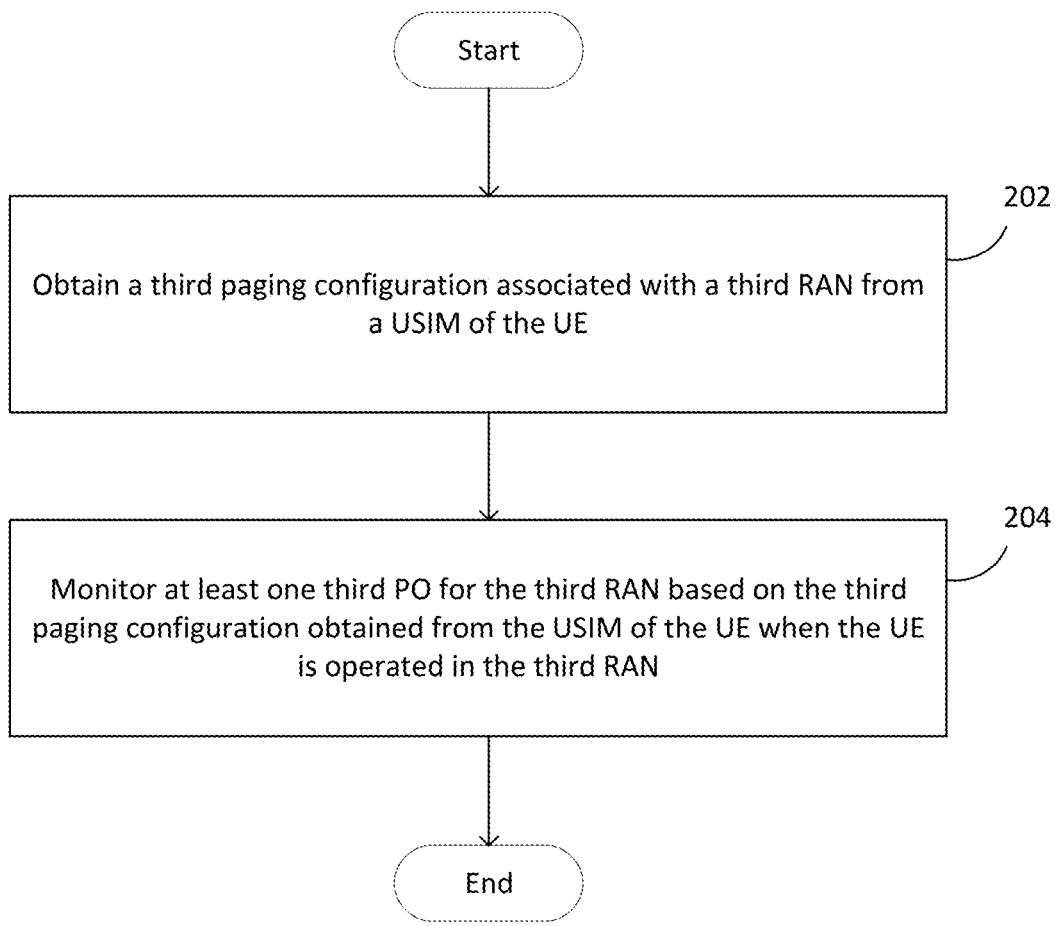
FIG. 2 is a schematic diagram illustrating a flowchart for a method of performing a paging monitoring procedure in RANs, in accordance with an example implementation of the present application.

FIG. 2 is a schematic diagram illustrating a flowchart for a method of performing a paging monitoring procedure in RANs, in accordance with an example implementation of the present application.

In action 202, a UE may obtain a third paging configuration associated with (a cell of) a third RAN from a USIM of the UE. For example, the UE may be preconfigured with one or more parameters in the third paging configuration in the USIM associated to (the cell of) the third RAN. The third paging configuration in the USIM may be applied by the UE to perform paging monitoring and/or reception in the associated network (e.g., (the cell of) the third RAN). In some implementations, the third RAN may be an NR RAN or an LTE RAN, which may be the Network A, the Network B or another network different from the Network A and Network B.

In action 204, the UE may monitor at least one third PO for (the cell of) the third RAN based on the third paging configuration obtained from the USIM of the UE when the UE is operating in the third RAN. For example, when the UE switches to camp on the cell of the third RAN, the UE may receive one or more paging messages (or PDCCH for paging) from (the cell of) the third RAN by monitoring the third PO(s) based on the third paging configuration.

Figure 3:
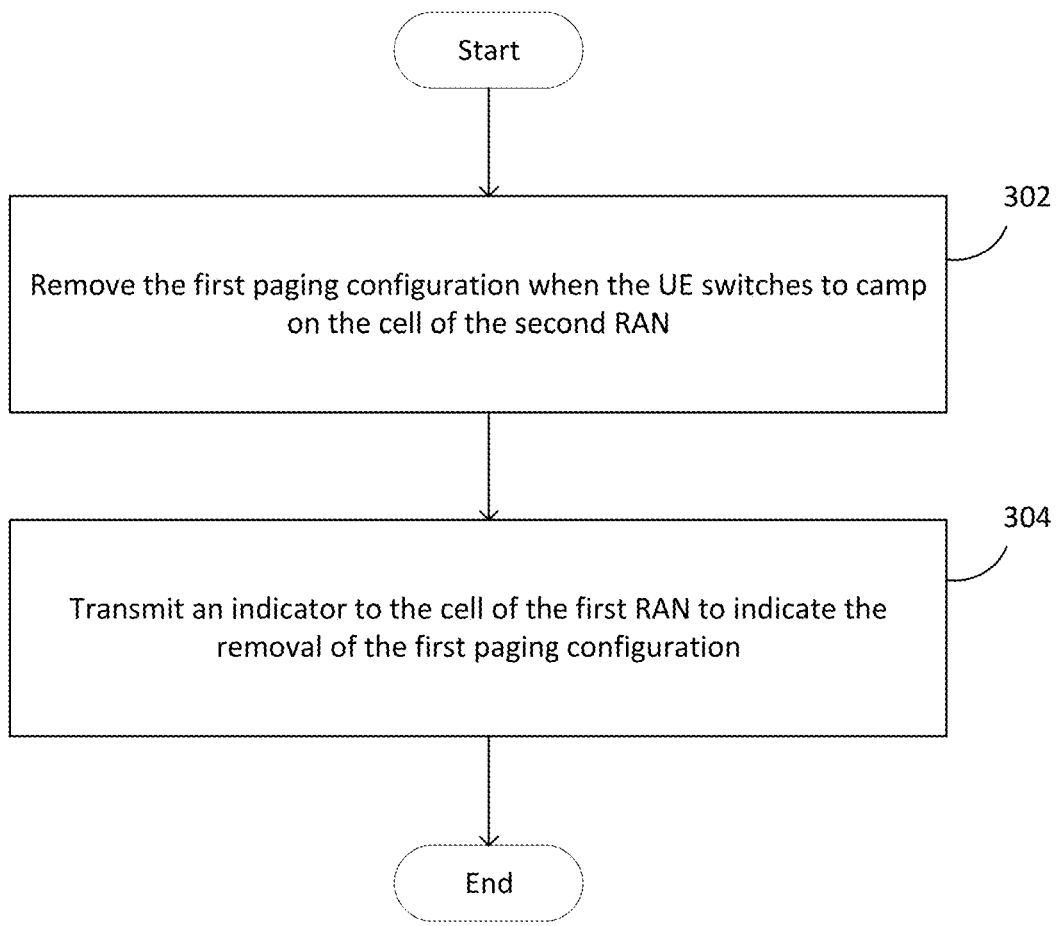
FIG. 3 is a schematic diagram illustrating a flowchart for a method of performing a paging monitoring procedure in RANs, in accordance with an example implementation of the present application.

FIG. 3 is a schematic diagram illustrating a flowchart for a method of performing a paging monitoring procedure in RANs, in accordance with an example implementation of the present application.

In action 302, a UE may remove the first paging configuration (for (the cell of) the first RAN, such as the Network A) when the UE switches to camp on the cell of the second RAN (e.g., the Network B). For example, when the UE camps on the cell of the second RAN, the UE may regard the first paging configuration associated with (the cell of) the first RAN as an invalid paging configuration by removing or clearing or releasing the first paging configuration.

In action 304, the UE may transmit an indicator to the cell of the first RAN to indicate the removal of the first paging configuration.

For example, when the UE switches from the cell of the first RAN (e.g., the Network A) to camp on the cell of the second RAN (e.g., the Network B) for performing paging monitoring/reception in the second RAN, the UE may regard the first paging configuration for the first RAN as an invalid paging configuration and notify the first RAN with the indicator. In some implementations, the indicator may be a Boolean indicator. For example, the indicator may be set to '1' to notify (the cell of) the first RAN that the UE regards the first paging configuration for (the cell of) the first RAN as a valid paging configuration (e.g., by storing the first paging configuration for (the cell of) the first RAN) after the UE performs a network switch to camp on the cell of the second RAN. Conversely, the indicator may be set to '0' or 'absent' to notify (the cell of) the first RAN that the UE regards the first paging configuration for the first RAN is an invalid paging configuration (e.g., by removing or clearing or releasing the first paging configuration for (the cell of) the first RAN) after the UE performs a network switch to camp on the cell of the second RAN. In some implementations, the UE may inform a network of a network switch (e.g., to switch to camp on a cell of another network) via a 2-step Random Access (RA) procedure, a 4-step Random Access (RA) procedure or small data transmission procedure. For example, the UE may send the indicator to the network in Msg A of a 2-step RA procedure, e.g., on the Physical Uplink Shared Channel (PUSCH) of the Msg A. For another example, the UE may send the indicator to the network via a message (e.g., RRC signaling, RRC message, RRC Resume Request message, RRC System Information Request message) and/or resources (e.g., a PUSCH and/or a PUCCH) based on small data transmission mechanism. For another example, the UE may send the indicator to the network in Msg 3 of a 4-step RA procedure, e.g., on the PUSCH of the Msg 3, in the RRC message (e.g., RRC System Information Request message, RRC Resume Request message, RRC Setup Request message) carried by Msg 3. In some implementations, the network which the UE sends the indicator to may be the network which the UE switches from or the network which the UE switches to. For example, the UE may inform Network A of its network switch from Network A to Network B (e.g., implicitly via the indicator, or explicitly via the indicator and other information related to the network switch). For another example, the UE may inform Network B of its network switch from Network A to Network B (e.g., implicitly via the indicator, or explicitly via the indicator and other information related to the network switch). The information related to the network switch may be the information of the network which the UE switches to (e.g., cell ID, PLMN ID, RAT information), or may be the information of the network which the UE switches from (e.g., cell ID, PLMN ID, RAT information).

In some implementations, a paging configuration (e.g., the first, second or third paging configuration) may include at least one of: the parameter(s) used for a PF/PO formula, the parameter(s) for the UE to derive the radio resources (e.g., the time and/or frequency domain resources) to receive paging messages and/or a PDCCH addressed to an RNTI associated with paging (e.g., Paging RNTI (P-RNTI)) (e.g., the UE may receive paging DCI which is scrambled by the P-RNTI on the PDCCH), the parameter(s) for the UE to begin/activate paging monitoring in a network (e.g., (the cells of) the first, second or third RAN, depending on which RAN the paging configuration is associated with), and the parameter(s) for the UE to stop/inactivate/deactivate paging monitoring in a network (e.g., (the cells of) the first, second or third RAN, depending on which RAN the paging configuration is associated with). For example, the second paging configuration (e.g., for (the cell of) the second RAN) may include at least one of: the parameter(s) for the UE to derive locations of radio resources (based on which the UE may monitor the at least one second PO for the second RAN), the parameter(s) for activating/initiating/starting a paging monitoring procedure in (the cell of) the second RAN, and the parameter(s) for inactivating/stopping/deactivating the paging monitoring procedure in (the cell of) the second RAN.

In some implementations, the parameters in a paging configuration (e.g., the first, second or third paging configuration) may include at least one of a System Frame Number (SFN), a DRX cycle (T), the total paging frame number in a DRX cycle (N), the number of POs for a PF (Ns), the number of actual transmitted SSBs (S), a beam sweeping round (X), the paging DCI, a short message, an indicator for the UE to stop/inactivate/deactivate paging monitoring, an indicator for the UE to stop/inactivate/deactivate paging monitoring in a network (e.g., stop/inactivate/deactivate a paging monitoring procedure for (a cell of) a RAN), and an indicator for the UE to begin/activate paging monitoring in a network (e.g., begin/activate/initiate a paging monitoring procedure for a RAN).

In some implementations, a UE may be (pre)configured with a paging configuration for a corresponding network (e.g., RAN). For example, if a UE is equipped with Multi-SIM, the UE may be (pre)configured with separate paging configurations for the corresponding networks, e.g., one paging configuration associated with the Network A and another paging configuration associated with the Network B. In some implementations, each network may configure the paging configuration associated to itself to the UE, via dedicated signaling, system information or pre-configuration. For example, the Network A may configure (or update or transmit) the paging configuration associated with the Network A to the UE, where the paging configuration associated with the Network A may be updated by the Network A (only the Network A, not the Network B). In some implementations, the UE may store a paging configuration associated with the Network A, and another paging configuration associated with the Network B. In some implementations, the UE may apply a paging configuration associated with the Network A to perform paging monitoring/reception in (the cell of) the Network A, and apply another paging configuration associated with the Network B to perform paging monitoring/reception in (the cell of) the Network B. In some implementations, the Network A may configure (or update or transmit) the paging configuration associated with the Network B to the UE, as illustrated in FIG. 1. In some implementations, the Network B may configure (or update or transmit) the paging configuration associated with the Network A to the UE.

In some implementations, if a UE is equipped with Multi-SIM, the UE may be (pre)configured with a shared paging configuration which is commonly used for both the Network A and the Network B. The UE may apply the shared paging configuration and perform paging monitoring/reception in both (the cell of) the Network A and (the cell of) the Network B based on the shared paging configuration. In some implementations, the shared paging configuration may include a first set of parameters required for the UE to perform paging monitoring and reception in the Network A, and a second set of parameters required for the UE to perform paging monitoring and reception in Network B. Moreover, the shared paging configuration may include a third set of parameters required for the UE to perform paging monitoring and reception in (the cell of) the Network A and in (the cell of) the Network B.

In some implementations, both the Network A and the Network B may configure (or update or transmit) the shared paging configuration to the UE. In some implementations, the Network A may configure (or update) the first set of parameters required for the UE to perform paging monitoring/reception in (the cell of) the Network A, and the Network B may configure (or update) the second set of parameters required for the UE to perform paging monitoring/reception in (the cell of) the Network B. For example, the Network A may configure (or update) the first set of parameters required for the UE to perform paging monitoring/reception in (the cell of) the Network A, without configuring the second set of parameters required for the UE to perform paging monitoring/reception in (the cell of) the Network B. In another example, the Network B may configure (or update) the second set of parameters required for the UE to perform paging monitoring/reception in (the cell of) the Network B, without configuring the first set of parameters required for the UE to perform paging monitoring/reception in (the cell of) the Network A.

In some implementations, the Network A may configure (or update) the parameters in the shared paging configuration, based on which the UE may perform paging monitoring and reception in (the cell of) the Network A, e.g., the first set of parameters required for the UE to perform paging monitoring/reception in (the cell of) the Network A, and the third set of parameters required for the UE to perform paging monitoring/reception in (the cell of) the Network A and in (the cell of) the Network B. In some implementations, the Network A may configure (or update) all the parameters in the shared paging configuration including the first set of parameters required for the UE to perform paging monitoring/reception in (the cell of) the Network A, the second set of parameters required for the UE to perform paging monitoring/reception in (the cell of) the Network B, and the third set of parameters required for the UE to perform paging monitoring/reception in (the cell of) the Network A and in (the cell of) the Network B. The conditions of when to (pre)configure the UE with a shared paging configuration may include at least one of: 1) when the CNs of the networks associated to the USIMs are the same (e.g., the CNs of the Network A and the Network B are the same), 2) when the operators of the networks associated to the USIMs are the same (e.g., the operators of the Network A and the Network B are the same), and 3) when one of the operators of networks associated to the USIMs is a non-public network operator (e.g., the operator of the Network A is a public network operator, and the operator of the Network B is a non-public network operator such as a PNI-NPN operator).

In some implementations, a UE may be preconfigured with one or more parameters in a paging configuration via a NAS configuration or NAS signaling for an associated network. The NAS entity of the CN of the associated network (e.g., the Access and Mobility Management Function (AMF) entity in the 5GC) and the NAS entity of the UE may perform NAS signaling exchange. The NAS signaling exchange may be forwarded via the cell (or BS) in the associated network among the NAS entity of the CN of the associated network and the NAS entity of the UE. The NAS signaling may be carried (or encapsulated) into the RRC signaling (i.e., in the RRC message) by the UE or the CN. The UE may transmit (or receive) the RRC signaling including the NAS signaling to (or from) the cell/BS of the associated network. The CN of the associated network may transmit (or receive) the signaling (e.g., a kind of signaling between the CN of the associated network and the cell/BS of the associated network) including the NAS signaling to (or from) the cell/BS of the associated network. For example, the NAS signaling may include paging parameters for updating the UE's paging configuration. In some implementations, the preconfigured paging configuration associated to a network may be updated by the CN of the associated network via NAS signaling.

Figure 4:
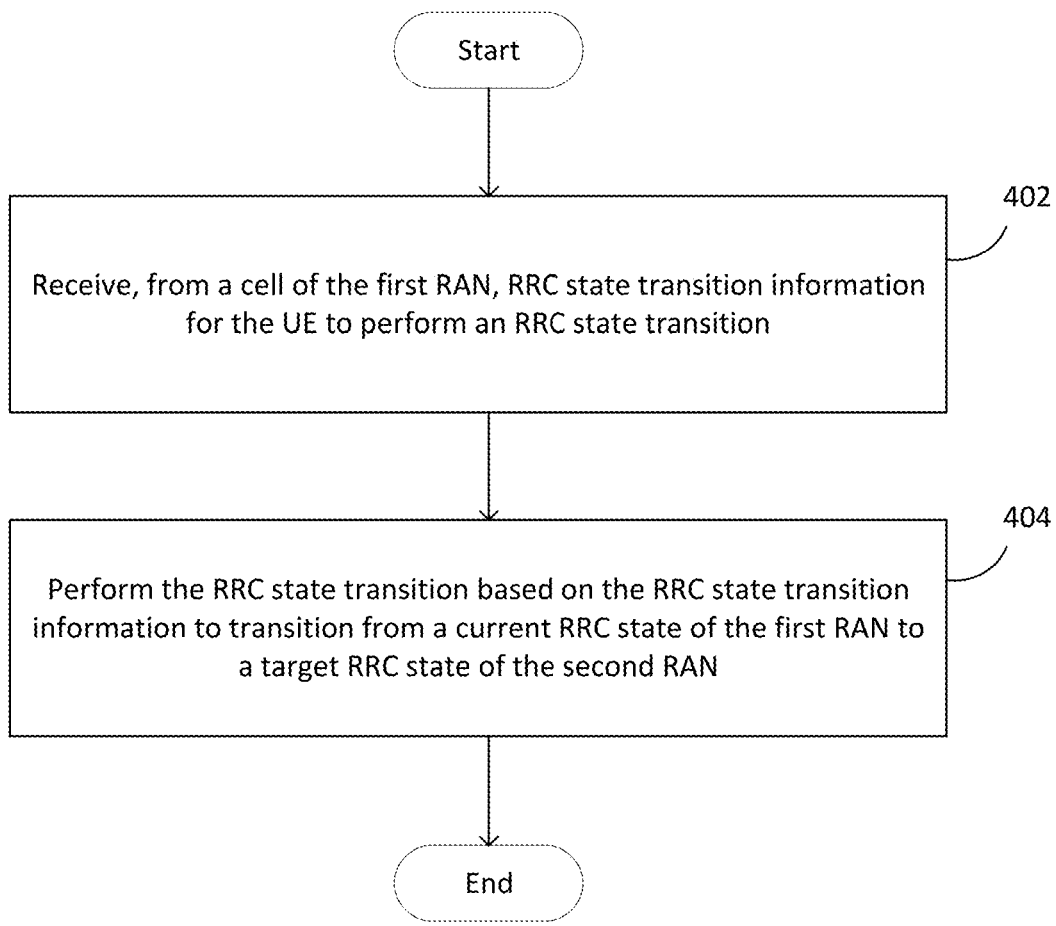
FIG. 4 is a schematic diagram illustrating a flowchart for a method of performing a paging monitoring procedure in RANs, in accordance with an example implementation of the present application.

FIG. 4 is a schematic diagram illustrating a flowchart for a method of performing a paging monitoring procedure in RANs, in accordance with an example implementation of the present application.

In action 402, a UE may receive, from a cell of the first RAN (e.g., the Network A), RRC state transition information for the UE to perform an RRC state transition.

In action 404, the UE may perform the RRC state transition based on the RRC state transition information to transition from a current RRC state of the first RAN to a target RRC state of the second RAN.

For example, the UE may receive the RRC state transition information from the camped/serving cell of the first RAN via dedicated signaling (e.g., an RRC message, an RRC Reconfiguration message, an RRC Release message, an RRC Release message with a suspend configuration, an RRC Release message without a suspend configuration, an RRC Resume message, or an RRC Setup message). Once the UE transitions from the current RRC state of the first RAN to the target RRC state of the second RAN, the UE may apply the second paging configuration for the second RAN to monitor the PO(s) for (the cell of) the second RAN. That is, the second paging configuration may be used for the UE to apply in the target RRC state of the second RAN to monitor at least one PO for (the cell of) the second RAN. In some implementations, the target RRC state of the second RAN may be an RRC_IDLE state of the second RAN, an RRC_INACTIVE state of the second RAN, or an RRC_CONNECTED state of the second RAN. The second paging configuration may be associated to (the cell of) the second RAN (e.g., Network B). The UE may apply the second paging configuration for paging monitoring and reception in (the cell of) the second RAN. In some implementations, the UE may receive the second paging configuration together with the RRC state transition information in the same dedicated signaling from (the cell of) the first RAN (e.g., Network A). In some implementations, the UE may receive the second paging configuration together with the RRC state transition information in the same dedicated signaling from (the cell of) the second RAN (e.g., Network B).

In some implementations, when the UE detects a paging collision (e.g., the UE may not receive (or decode) the PDCCH addressed to an RNTI associated with paging in the indicated PDCCH monitoring occasions for paging (e.g., PO(s)), the UE may inform the network (e.g., the Network A) of the paging collision via dedicated signaling (e.g., including a paging collision indicator). Afterwards, the UE may receive an updated paging configuration from the camped/serving cell of the network (e.g., the Network A) via dedicated signaling. The UE may then apply the updated paging configuration to monitor the PO(s) for the network (e.g., the Network A). In some implementations, the UE may determine that the paging collision happens when the UE does not successfully detect the PDCCH addressed to an RNTI associated with paging (e.g., the PDCCH may be addressed to a P-RNTI) in PDCCH monitoring occasion(s) for paging based on the P-RNTI and the PDCCH monitoring occasion(s) instructed by the network (e.g., the Network A). In some implementations, when the UE detects a paging collision, the UE may inform the network (e.g., the Network A) of the paging collision via an indicator (e.g., on PUCCH resources, Uplink Control Information (UCI), a Boolean indicator). In response to the paging collision indicator, the UE may receive an updated paging configuration from the camped/serving cell of the network (e.g., the Network A) via dedicated signaling. The UE may then apply the updated paging configuration to monitor the PO(s) for the network (e.g., the Network A).

In some implementations, the UE may receive the paging configuration from the camped/serving cell via system information (e.g., SIB1, OSI, or Downlink Common Configuration in SIB1). In some implementations, if the UE is equipped with Multi-SIM, the UE may consider two camped/serving cells, where one camped/serving cell may belong to the Network A (associated to one USIM) and another camped/serving cell may belong to the Network B (associated to another USIM). In some implementations, the UE may apply the paging configuration (received from the camped/serving cell of the Network A) to receive the paging information from (or generated by) the camped/serving cell of the Network A. In some implementations, the UE may apply the paging configuration (received from the camped/serving cell of the Network B) to receive the paging information from (or generated by) the camped/serving cell of the Network B. In some implementations, the UE may apply the paging configuration (received from the camped/serving cell of the Network A) to receive the paging information from (or generated by) the camped/serving cell of the Network B. In some implementations, the UE may apply the paging configuration (received from the camped/serving cell of the Network B) to receive the paging information from (or generated by) the camped/serving cell of the Network A. In some implementations, the UE may apply the paging configuration (received from the camped/serving cell of the Network A) to receive the paging information from (or generated by) the CN of the Network A via the camped/serving cell of the Network A. In some implementations, the UE may apply the paging configuration (received from the camped/serving cell of the Network B) to receive the paging information from (or generated by) the CN of the Network B via the camped/serving cell of the Network B.

In some implementations, the UE may apply the paging configuration received from camped/serving cell of the Network A or the Network B to receive the paging information from (or generated by) the CN of the Network A or the CN of the Network B via the camped/serving cell of the Network A and/or via the camped/serving cell of the Network B. Such implementations may be applicable (but not limited to) when 1) the CN of the Network A and the CN of the Network B are the same, 2) the operator of the Network A and the operator of the Network B are the same, or 3) one of the operators of the networks associated to the USIMs is a non-public network operator.

In some implementations, if the UE is (pre)configured with a paging configuration associated to the Network A, where the UE may apply the paging configuration to monitor PO(s) for the Network A, the UE may receive messages (e.g., paging messages, dedicated signaling, system information, or NAS signaling) from the camped/serving cell associated to the Network B to update the paging configuration associated to the Network A.

In some implementations, there may be updating information (e.g., a network indicator) and updated paging configuration in the received messages. The updating information may inform the UE with which network the updated paging configuration is associated. In other implementations, the updated paging configuration in the received messages may include the updating information (e.g., a network indicator). The updating information may inform the UE with which network the updated paging configuration is associated. After receiving the updated paging configuration, the UE may update the paging configuration associated with a network indicated by the network indicator, and apply the updated paging configuration for paging monitoring/reception of the associated network.

Figure 5:
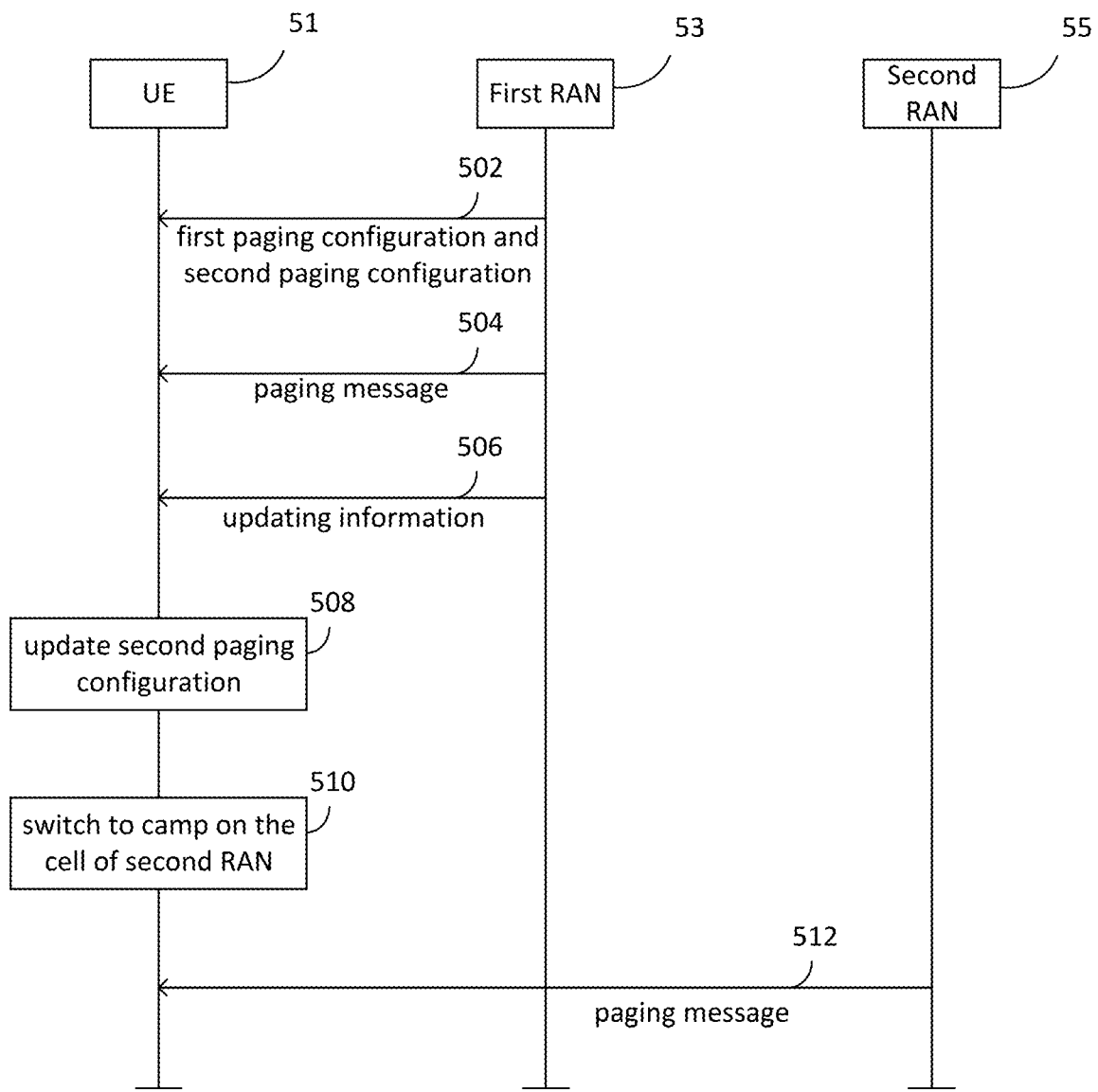
FIG. 5 is a sequence diagram illustrating an exchange of messages among a UE, a first RAN, and a second RAN, in accordance with an example implementation of the present application.

FIG. 5 is a sequence diagram illustrating an exchange of messages among UE 51, first RAN 53, and second RAN 55, in accordance with an example implementation of the present application. In the implementation, during the updating procedure, UE 51 may update the second paging configuration based on dedicated signaling transmitted by the cell of first RAN 53 or based on system information broadcast by the cell of first RAN 53, before UE 51 switches to camp on the cell of second RAN 55.

In action 502, UE 51 may receive a first paging configuration associated to first RAN 53 and a second paging configuration associated to second RAN 55 from first RAN 53. In some implementations, UE 51 may receive the RRC message (e.g., RRC Reconfiguration message, RRC Release message with suspend configuration, RRC Release message without suspend configuration) including the first paging configuration associated to first RAN 53 and the second paging configuration associated to second RAN 55 from first RAN 53. In some implementations, the second paging configuration associated to second RAN 55 may be a null configuration. In some implementations, UE 51 may not receive the second paging configuration associated to second RAN 55 from first RAN 53. In some implementations, UE 51 may be preconfigured with the second paging configuration associated to second RAN 55.

In action 504, UE 51 may receive paging message(s), based on the first paging configuration, from first RAN 53 by monitoring PO(s) configured for first RAN 53. In some implementations, UE 51 may receive the PDCCH addressed to an RNTI associated with paging in the PDCCH monitoring occasions (e.g., PO(s)), based on the first paging configuration. UE 51 may derive the location of time/frequency resources to receive paging message(s) from first RAN 53.

In action 506, UE 51 may receive updating information, from first RAN 53, for updating the second paging configuration, where the updating information may be included in dedicated signaling transmitted by the serving/camped cell of first RAN 53, or system information broadcast by the serving/camped cell of first RAN 53. In some implementations, UE 51 may receive updating information, from first RAN 53, for updating the first paging configuration, where the updating information may be included in dedicated signaling transmitted by the serving/camped cell of first RAN 53, or system information broadcast by the serving/camped cell of first RAN 53.

In action 508, UE 51 may update the second paging configuration based on the updating information from first RAN 53. In some implementations, UE 51 may update the first paging configuration based on the updating information from first RAN 53.

In action 510, UE 51 may switch from the serving/camped cell of first RAN 53 to camp on the serving/camped cell of second RAN 55.

In action 512, UE 51 may receive paging message(s), based on the updated second paging configuration, from second RAN 55 by monitoring PO(s) configured for second RAN 55. In some implementations, UE 51 may receive the PDCCH addressed to an RNTI associated with paging in the PDCCH monitoring occasions (e.g., PO(s)), based on the updated second paging configuration. UE 51 may derive the location of time/frequency resources to receive paging message(s) from second RAN 55.

Figure 6:
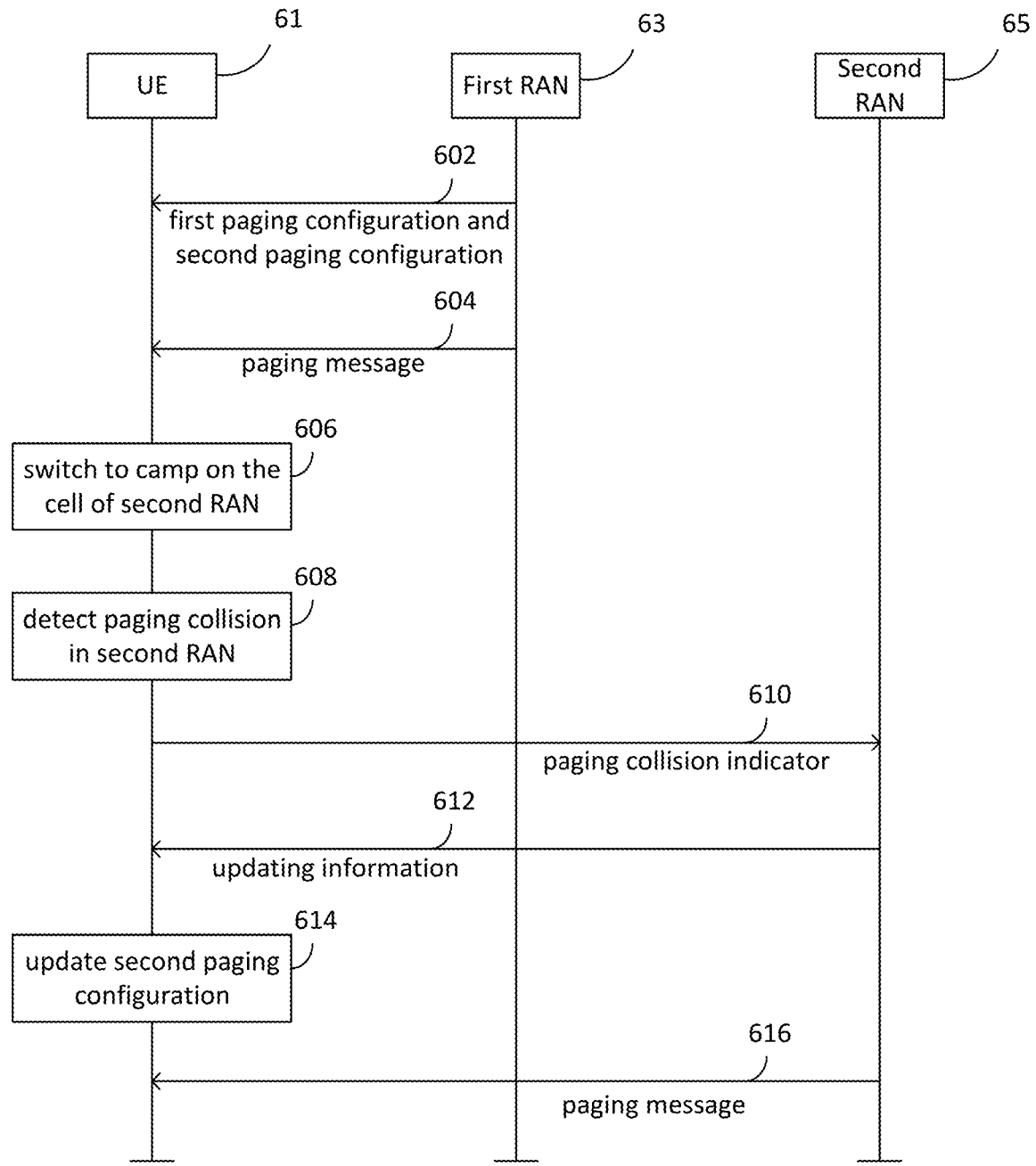
FIG. 6 is a sequence diagram illustrating an exchange of messages among a UE, a first RAN, and a second RAN, in accordance with an example implementation of the present application.

FIG. 6 is a sequence diagram illustrating an exchange of messages among UE 61, first RAN 63, and second RAN 65, in accordance with an example implementation of the present application. In the implementation, during the updating procedure, UE 61 may update the second paging configuration based on a dedicated signaling transmitted by the cell of second RAN 65 or based on system information broadcast by the cell of second RAN 65, after UE 61 switches to camp on the cell of second RAN 65.

As shown in FIG. 6, in action 602, UE 61 may receive a first paging configuration associated to first RAN 53 and a second paging configuration associated to second RAN 65 from first RAN 63. In some implementations, the second paging configuration associated to second RAN 65 may be a null configuration. In some implementations, UE 61 may not receive the second paging configuration associated to second RAN 65 from first RAN 63. In some implementations, UE 61 may be preconfigured with the second paging configuration associated to second RAN 65.

In action 604, UE 61 may receive paging message(s), based on the first paging configuration, from first RAN 63 by monitoring PO(s) configured for first RAN 63. In some implementations, UE 61 may receive the PDCCH addressed to an RNTI associated with paging in the PDCCH monitoring occasions (e.g., PO(s)), based on the first paging configuration. UE 61 may derive the location of time/frequency resources to receive paging message(s) from first RAN 63.

In action 606, UE 61 may switch from the serving/camped cell of first RAN 63 to camp on the serving/camped cell of second RAN 65.

In action 608, UE 61 may detect a paging collision in second RAN 65 (e.g., when UE 61 does not successfully detect the PDCCH addressed to an RNTI associated with paging (e.g., P-RNTI) in PDCCH monitoring occasion(s) (e.g., PO(s)) for paging based on the RNTI associated with paging and the PDCCH monitoring occasion(s) instructed by second RAN 65).

In action 610, UE 61 may transmit a paging collision indicator to the serving/camped cell of second RAN 63 when UE 61 detects the paging collision in (the cell of) second RAN 65.

After transmitting the paging collision indicator to the cell of second RAN 65, in action 612, UE 61 may receive (e.g., in the dedicated signaling) from the serving/camped cell of second RAN 65, updating information for updating the second paging configuration.

In action 614, UE 61 may update the second paging configuration based on the updating information from second RAN 65.

In action 616, UE 61 may receive paging message(s), based on the updated second paging configuration, from second RAN 65 by monitoring PO(s) configured for second RAN 65.

In some implementations, the update of the second paging configuration may be triggered by other conditions (e.g., when UE 61 receives specific instruction(s) from the network, and/or when UE 61 follows a predetermined trigger condition) and not limited to detecting the paging collision by the UE.

Figure 7:
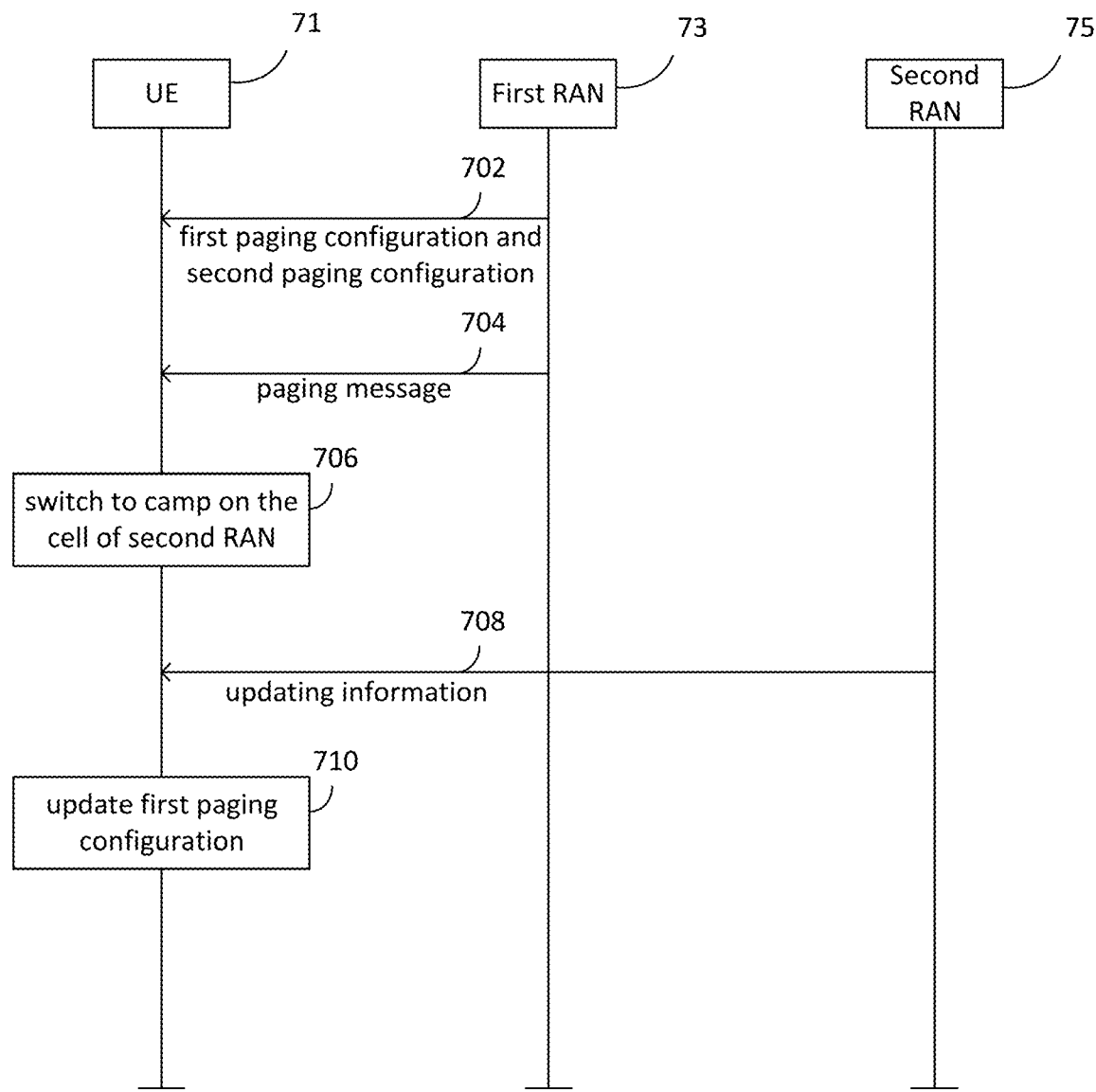
FIG. 7 is a sequence diagram illustrating an exchange of messages among a UE, a first RAN, and a second RAN, in accordance with an example implementation of the present application.

FIG. 7 is a sequence diagram illustrating an exchange of messages among UE 71, first RAN 73, and second RAN 75, in accordance with an example implementation of the present application. In the implementation, during the updating procedure, UE 71 may update the first paging configuration based on a dedicated signaling transmitted by the cell of second RAN 75 or based on system information broadcast by the cell of second RAN 75, after UE 71 switches to camp on the cell of second RAN 75.

As shown in FIG. 7, in action 702, UE 71 may receive a first paging configuration associated to first RAN 73 and a second paging configuration associated to second RAN 75 from first RAN 73. In some implementations, the second paging configuration associated to second RAN 75 may be a null configuration. In some implementations, UE 71 may not receive the second paging configuration associated to second RAN 75 from first RAN 73. In some implementations, UE 71 may be preconfigured with the second paging configuration associated to second RAN 75.

In action 704, UE 71 may receive paging message(s), based on the first paging configuration, from first RAN 73 by monitoring PO(s) configured for first RAN 73. In some implementations, UE 71 may receive the PDCCH addressed to an RNTI associated with paging in the PDCCH monitoring occasions (e.g., PO(s)), based on the first paging configuration. UE 71 may derive the location of time/frequency resources to receive paging message(s) from first RAN 73.

In action 706, UE 71 may switch from the serving/camped cell of first RAN 73 to camp on the serving/camped cell of second RAN 75.

In action 708, UE 71 may receive updating information, from second RAN 75, for updating the first paging configuration associated to first RAN 73, where the updating information may be included in a dedicated signaling transmitted by the serving/camped cell of second RAN 75, or system information broadcast by the serving/camped cell of second RAN 75.

In action 710, UE 71 may update the first paging configuration based on the updating information from second RAN 75.

In some implementations, the UE may perform one or more updating procedures (e.g., as illustrated in FIGS. 5, 6 and 7) to update the paging configuration(s) (e.g., the first paging configuration and/or the second paging configuration).

In some implementations, the UE may receive paging message(s) from a camped/serving cell of the Network A including the UE identity (ID) and the information of the associated network for the corresponding UE ID(s) (e.g., the Network A or the Network B). If the UE receives a paging message including its UE ID from a camped/serving cell of the Network A and the associated network for the UE ID is the Network B, the UE may switch from the Network A to the Network B, e.g., by performing an RA procedure (e.g., 2-step RA procedure, 4-step RA procedure) in the Network B.

In some implementations, if the UE receives a paging message including its UE ID from a camped/serving cell of the Network A and the associated network for the UE ID is the Network B, the UE may stop paging monitoring/reception in the Network A.

In some implementations, if the UE receives a paging message including its UE ID from a camped/serving cell of the Network A and the associated network for the UE ID is the Network B, the UE may store the paging configuration associated to the Network A and keep it valid.

In some implementations, if the UE receives a paging message including its UE ID from a camped/serving cell of the Network A and the associated network for the UE ID is the Network B, the UE may remove/release/clear the paging configuration associated to the Network A and regard it as an invalid configuration.

In some implementations, if the UE receives a paging message including its UE ID from a camped/serving cell of the Network A and the associated network for the UE ID is the Network B, the UE may apply the preconfigured/default paging configuration associated to Network A when the UE switches back to perform the paging monitoring and reception procedure in the Network A after the UE performs the paging monitoring and reception procedure in the Network B.

In some implementations, if the UE receives a paging message including its UE ID from a camped/serving cell of the Network A and the associated network for the UE ID is the Network B, the UE may start a timer associated to the first paging configuration for the Network A and store the first paging configuration for the Network A. If the UE switches back to Network A for paging monitoring and reception and the timer does not expire, the UE may apply the (stored) first paging configuration associated with the Network A and perform the paging monitoring and reception procedure in the Network A. The UE may stop (or restart) the timer associated to the paging configuration for the Network A. If the UE switches back to Network A for paging monitoring and reception and the timer expires, the UE may perform the paging monitoring and reception procedure in the Network A based on the default or preconfigured paging configuration for the Network A rather than the stored first paging configuration for the Network A. Upon the timer expiry, the UE may invalidate the stored first paging configuration for the Network A, e.g., by removing, deleting, or releasing the stored first paging configuration for the Network A.

In some implementations, the UE may determine the PDCCH monitoring occasion(s) for paging based on the PF/PO formula and/or the paging configuration. The UE may determine the PO(s) and PF based on the PF/PO formula and/or the paging configuration. The UE may monitor the PDCCH monitoring occasion(s) for paging in a PO. A PO may include at least one PDCCH monitoring occasion for paging. For a UE, there may be at least one PO per DRX cycle. If a UE detects a PDCCH addressed to a P-RNTI within the PDCCH monitoring occasion for paging, the UE may further decode and/or receive the paging DCI (e.g., which is scrambled by the P-RNTI).

In some implementations, the paging DCI may include at least one of a short message, a short message indicator, a time/frequency resource (e.g., a PDSCH resource) to receive the paging messages, an indicator to begin monitoring the PDCCH monitoring occasion(s) for paging in another network, an indicator to stop monitoring the PDCCH monitoring occasion(s) for paging in the current operated network, and an indicator to switch to another network (e.g., if the UE is equipped with Multi-SIM) to monitor the PDCCH monitoring occasion(s) for paging.

In some implementations, the paging configuration may be invalid upon the UE's state transition (e.g., from the RRC_CONNECTED state to the RRC_INACTIVE state, from the RRC_CONNECTED state to the RRC_IDLE state, or from the RRC_INACTIVE state to the RRC_IDLE state). For example, the UE may receive and apply the paging configuration when operating in the RRC_INACTIVE state, and after the UE transitions to the RRC_IDLE state, the RRC_IDLE UE may not apply the paging configuration used in the RRC_INACTIVE state. For example, the UE may clear or remove the paging configuration upon state transition, so that the paging configuration used in the RRC_INACTIVE state may become invalid for the RRC_IDLE UE. The RRC_IDLE UE may apply the preconfigured paging configuration or the paging configuration broadcast by a camped cell (e.g., an NR cell or an EUTRA cell) for paging monitoring.

In some implementations, if the UE is equipped with Multi-SIM, the paging configuration associated to one network may be invalid upon the UE's state transition (e.g., from the RRC_CONNECTED state to the RRC_INACTIVE state, from the RRC_CONNECTED state to the RRC_IDLE state, or from the RRC_INACTIVE state to the RRC_IDLE state) in a network. For example, the paging configuration associated to one network and applied by the UE when the UE is in one RRC state of the network may be invalid when the UE is in (or transitions to) another RRC state of the network. In another example, the paging configuration associated to one network and used by the UE when the UE is in one RRC state of the network may be invalid when the UE switches to another network for paging monitoring/reception. In another example, when the UE switches from one network (e.g., the Network A) to another network (e.g., the Network B) for paging monitoring/reception, the UE may transition its RRC state in the Network A to the RRC_IDLE state.

In some implementations, the UE may make the paging configuration associated to one network be invalid by removing or clearing the paging configuration stored in the UE.

In some implementations, once the paging configuration associated to one network (e.g., the Network A) becomes invalid, the UE may apply the preconfigured paging configuration (e.g., stored in the USIM associated to the Network A), and/or apply a paging configuration (e.g., for the Network A), which is broadcast by a camped/serving cell in another network (e.g., the Network B), to perform the paging monitoring and reception procedure in the network (e.g., the Network A), when the UE switches from the other network (e.g., the Network B) back to the original network (e.g., the Network A).

In some implementations, when the UE switches from one network (e.g., the Network A) to another network (e.g., the Network B) for paging monitoring/reception, the UE may start a timer associated to the paging configuration applied for paging monitoring/reception in the network (e.g., the Network A). When the UE switches back to the original network (e.g., the Network A) and the timer does not expire, the UE may apply the paging configuration associated to the timer for paging monitoring/reception in the network (e.g., the Network A). The UE may stop or restart the timer associated to the paging configuration for paging monitoring/reception in the network (e.g., the Network A). When the UE switches back to the original network (e.g., the Network A) and the timer expires, the UE may not apply the paging configuration associated to the timer for paging monitoring/reception in the network (e.g., the Network A). The UE may consider the paging configuration associated to the timer to be invalid once the timer expires.

In some implementations, the value of the timer may be preconfigured to the UE, may be configured to the UE via system information by the network associated to the timer, may be configured to the UE via dedicated signaling by the network associated to the timer, and/or may be included in the paging configuration associated to the network for paging monitoring/reception based on the paging configuration.

In some implementations, the UE may receive an RRC message (e.g., an RRC Release message) from a serving cell of a network, which implies the UE needs to perform an RRC state transition to the RRC_IDLE state of the network.

In some implementations, the UE may receive an RRC message (e.g., an RRC Release message with a suspend configuration) from a serving cell of a network, which implies the UE needs to perform an RRC state transition to the RRC_INACTIVE state of the network.

In some implementations, the UE may receive an RRC message (e.g., an RRC Reconfiguration message, an RRC Release message, an RRC Release with a suspend configuration, or an RRC Reject message) including a specific indicator, which implies the UE needs to perform a network switch (e.g., from the Network A to the Network B), if the UE is equipped with Multi-SIM.

In some implementations, the paging configuration may be valid upon the UE's state transition (e.g., from the RRC_CONNECTED state to the RRC_INACTIVE state, from the RRC_CONNECTED state to the RRC_IDLE state, or from the RRC_INACTIVE state to the RRC_IDLE state). For example, the UE may receive and apply the paging configuration in the RRC_INACTIVE sate. After the UE transitions to the RRC_IDLE state, the RRC_IDLE UE may apply the paging configuration used in the RRC_INACTIVE state and store the paging configuration upon state transition. In such a case, the paging configuration used in the RRC_INACTIVE state may be valid for the RRC_IDLE UE. If the RRC_IDLE UE has a preconfigured paging configuration or receives a paging configuration broadcast from a camped cell (e.g., an NR cell or an EUTRA cell), the UE may apply the preconfigured or received paging configuration rather than the paging configuration used in the NR RRC_INACTIVE state.

In some implementations, if the UE is equipped with Multi-SIM, the paging configuration associated to one network may be still be valid upon the UE's state transition (e.g., from the RRC_CONNECTED state to the RRC_INACTIVE state, from the RRC_CONNECTED state to the RRC_IDLE state, or from the RRC_INACTIVE state to the RRC_IDLE state) in the network. For example, the paging configuration associated to one network and used by the UE when the UE is in one RRC state of the network may still be valid when the UE is in (or transitions to) another RRC state of the network. In another example, the paging configuration associated to one network and used by the UE when the UE is in one RRC state of the network may still be valid when the UE switches to another network for paging monitoring/reception. In another example, when the UE switches from the Network A to the Network B for paging monitoring/reception, the UE may perform an RRC state transition of the Network A simultaneously (e.g., the UE may transition its RRC state in the Network A to the RRC_IDLE state). In another example, when the UE switches from the Network A to the Network B for paging monitoring/reception, the UE may not perform an RRC state transition of the Network A simultaneously (e.g., the UE may not transition its RRC state in the Network A to the RRC_IDLE state), and the UE may maintain its RRC state of the Network A as the same before it switches to the Network B.

In some implementations, the UE may keep the paging configuration associated to one network valid by storing the paging configuration in the UE. In some implementations, if the paging configuration associated to one network (e.g., the Network A) is still valid, the UE may perform at least one of the following operations:

(1) the UE may not apply a preconfigured paging configuration (e.g., stored in the USIM associated to the Network A);

(2) the UE may not apply a paging configuration for the network (e.g., the Network A), which is broadcast from a camped/serving cell in another network (e.g., the Network B), for performing paging monitoring/reception in the network (e.g., the Network A);

(3) the UE may apply a stored valid paging configuration for performing paging monitoring/reception in the network (e.g., the Network A) upon the UE switches back to the network (e.g., the Network A); and (4) the UE may update the stored valid paging configuration for one network (e.g., the Network A) if the UE receives an updated paging configuration applied for the network (e.g., the Network A) from a camped/serving cell of another network (e.g., the Network B).

In some implementations, the paging configuration may be invalid upon the UE's inter-RAT state transition (e.g., from the NR RRC_INACTIVE state to the EUTRA RRC_IDLE state, from the EUTRA RRC_INACTIVE state to the NR RRC_IDLE state, from the NR RRC_IDLE state to the EUTRA RRC_IDLE state, from the EUTRA RRC_IDLE state to the NR RRC_IDLE state).

In some implementations, an EUTRA RRC_INACTIVE UE may camp on an EUTRA cell connecting to the 5GC. For example, the UE may receive and apply the paging configuration in the NR RRC_INACTIVE state. After the UE transitions to the EUTRA RRC_IDLE state, the RRC_IDLE UE may not apply the paging configuration used in the NR RRC_INACTIVE state. For example, the UE may clear, remove or release the paging configuration used in the NR_RRC INACTIVE state. The paging configuration used in the NR RRC_INACTIVE state may become invalid for the EUTRA RRC_IDLE UE. The EUTRA RRC_IDLE UE may apply a preconfigured paging configuration or a paging configuration broadcast from a camped cell (e.g., an EUTRA cell) for paging monitoring.

In some implementations, if the UE is equipped with Multi-SIM, the inter-RAT RRC state transition may be interpreted as the UE performing state transition from one RRC state of one network (e.g., the Network A) associated to one RAT (e.g., NR) to another RRC state of another network (e.g., the Network B) associated to another inter-RAT (e.g., LTE). Thus, when the UE performs inter-RAT state transition (e.g., transitions from one RRC state associated to one network (e.g., the Network A) to another RRC state associated to another network (e.g., the Network B), or switches from one network (e.g., the Network A) to another network (Network B)), the UE may regard the paging configuration associated to the network (e.g., the Network A) as an invalid paging configuration (e.g., by removing, clearing or releasing the paging configuration associated to the network (e.g., the Network A)).

In some implementations, once the paging configuration associated to one network (e.g., the Network A) becomes invalid, the UE (1) may apply a preconfigured paging configuration (e.g., stored in USIM associated to Network A), and/or (2) may apply a paging configuration for the network (e.g., the Network A), which is broadcast from a camped/serving cell in another network (e.g., the Network B), to perform paging monitoring/reception in the network (e.g., the Network A), when the UE switches back to the network (e.g., the Network A).

In some implementations, the UE may maintain separate RRC states for multiple networks, e.g., one RRC state for one network (e.g., the Network A) and another RRC state for another network (e.g., the Network B). For example, the UE may activate the RRC state of the Network A and deactivate the RRC state of the Network B when the UE switches to the Network A from the Network B. In other implementations, the UE may maintain one RRC state to be applied to multiple networks (e.g., the Network A and the Network B). For example, if the UE switches from the Network A to the Network B, the UE may transition an RRC state used in the Network A to be RRC_IDLE. The initial RRC state of one network may be RRC_IDLE once the UE switches to such network.

In some implementations, the paging configuration may be valid upon the UE's inter-RAT state transition (e.g., from the NR RRC_INACTIVE state to the EUTRA RRC_IDLE state, from the EUTRA RRC_INACTIVE state to the NR RRC_IDLE state, from the NR RRC_IDLE state to the EUTRA RRC_IDLE state, from the EUTRA RRC_IDLE state to the NR RRC_IDLE state). The EUTRA RRC_INACTIVE UE may camp on an EUTRA cell connecting to the 5GC. For example, the UE may receive and apply the paging configuration in the NR RRC_INACTIVE state. After the UE transitions to the EUTRA RRC_IDLE state, the RRC_IDLE UE may still apply the paging configuration used in the NR RRC_INACTIVE state. The EUTRA RRC_IDLE UE may store the paging configuration used in the NR RRC_INACTIVE state, where the paging configuration used in the NR RRC_INACTIVE state may be valid for the EUTRA RRC_IDLE UE.

In some implementations, if the EUTRA RRC_IDLE UE has the preconfigured EUTRA paging configuration or receives the paging configuration broadcast from a camped cell (e.g., an EUTRA cell), the UE may apply the preconfigured or received paging configuration rather than the paging configuration used in the NR RRC_INACTIVE state.

In some implementations, if the UE is equipped with Multi-SIM, the inter-RAT state transition may be interpreted as the UE performing state transition from one RRC state of one network (e.g., the Network A) associated to one RAT (e.g., NR) to another RRC state of another network (e.g., the Network B) associated to another inter-RAT (e.g., LTE). Thus, when the UE performs the inter-RAT state transition (e.g., transitions from one RRC state associated to one network (e.g., the Network A) to another RRC state associated to another network (e.g., the Network B), or switches from one network (e.g., the Network A) to another network (Network B)), the UE may store the paging configuration associated to the network (e.g., the Network A) and keep it valid.

In some implementations, once the paging configuration associated to one network (e.g., the Network A) is still valid, the UE may perform at least one of the following operations:

(1) the UE may not apply the preconfigured paging configuration (e.g., stored in the USIM associated to the Network A);

(2) the UE may not apply the paging configuration for the network (e.g., the Network A), which is broadcast from a camped/serving cell in another network (e.g., the Network B), to perform paging monitoring/reception in the network (e.g., the Network A);

(3) the UE may apply the stored valid paging configuration for paging monitoring/reception in the network (e.g., the Network A) upon the UE switches back to the network (e.g., the Network A); and (4) the UE may update the stored valid paging configuration for one network (e.g., the Network A) if the UE receives the updated paging configuration applied for the network (e.g., the Network A) from a camped/serving cell of another network (e.g., the Network B).

In some implementations, if the UE reselects a cell on a different band, the UE may store the paging configuration for the cell in a previous band. When the UE reselects a cell in the previous band, the UE may directly apply the stored paging configuration for the previous band. For example, the UE may be configured with one or more paging parameters for a cell on an unlicensed band (e.g., an NR-U cell). If the UE reselects a cell on a licensed band no matter the frequency prioritization is, the UE may store the paging parameter(s) for the cell on the unlicensed band. When the UE reselects a cell on the unlicensed band again, the UE may apply the stored paging parameter(s) for paging monitoring on the reselected cell on the unlicensed band. In another example, the UE may be configured with the paging parameter(s) for a cell on a licensed band (e.g., an NR cell or an EUTRA cell). If the UE reselects a cell on an unlicensed band no matter the frequency prioritization is, the UE may store the paging parameter(s) for the cell on the licensed band. When the UE reselects a cell on the licensed band again, the UE may apply the stored paging parameter(s) for paging monitoring on a reselected cell on the licensed band.

In some implementations, if the UE is equipped with Multi-SIM, the UE may operate on one band associated to a network (e.g., the Network A) and operate one another band associated to another network (e.g., the Network B). For example, a licensed band associated to the Network A and an unlicensed band associated to the Network B. For another example, a licensed band associated to the Network A and another licensed band associated to the Network B.

In some implementations, if the UE reselects a cell on a different band, the UE may clear or remove the paging configuration for the cell in a previous band. In such a case, the paging configuration may become invalid. When the UE reselects a cell in the previous band, the UE may use a preconfigured paging configuration for the previous band or apply the paging configuration broadcast from a camped cell in the previous band. For example, the UE may be configured with one or more paging parameters for a cell on an unlicensed band (e.g., an NR-U cell). If the UE reselects a cell on a licensed band no matter the frequency prioritization is, the UE may clear, release or remove the paging parameters for the cell on the unlicensed band. When the UE reselects a cell on the unlicensed band again, the UE may apply the preconfigured paging parameters for the cell on an unlicensed band or the paging configuration broadcast from the reselected cell on the unlicensed band for paging monitoring/reception on the reselected cell on the unlicensed band. In another example, the UE may be configured with the paging parameter(s) for a cell on a licensed band (e.g., an NR cell or an EUTRA cell). If the UE reselects a cell on an unlicensed band no matter the frequency prioritization is, the UE may release, remove or clear the paging parameter(s) for the cell on the licensed band. When the UE reselects a cell on the licensed band again, the UE may apply the preconfigured paging parameter(s) for the reselected cell on the licensed band or the paging configuration broadcast from the reselected cell on the licensed band to perform paging monitoring/reception on the reselected cell on the licensed band.

In some implementations, if the UE is equipped with Multi-SIM, the UE may operate on one band associated to a network (e.g., the Network A) and operate one another band associated to another network (e.g., the Network B). For example, a licensed band associated to the Network A and an unlicensed band associated to the Network B. For another example, a licensed band associated to the Network A and another licensed band associated to the Network B.

In some implementations, if the UE reselects a cell on a different band, the UE may store the paging configuration used for the cell in a previous band for a time period. For example, the UE may start a timer when it reselects a cell on a different band. Before the timer expires, if the UE reselects a cell in the previous band, the UE may directly apply the stored paging configuration associated to the timer for the previous band.

In some implementations, before the timer expires, if the UE reselects the same cell as the previous serving cell on the previous band, the UE may directly apply the stored paging configuration. Conversely, if the UE reselects a cell on the previous band which is different from the previous serving cell on the previous band, the UE may not directly apply the stored paging configuration.

In some implementations, before the timer expires, if the UE reselects any cell on the previous band, the UE may directly apply the stored paging configuration. The UE may stop (or restart) the timer when the UE reselects the same cell on the previous band as the previous serving cell on the previous band.

In some implementations, the UE may stop (or restart) the timer when the UE reselects any cell on the previous band. When the timer expires, the UE may release, clear or remove the stored paging configuration. If the timer expires and the UE reselects a cell on the previous band, the UE may use the preconfigured paging configuration for the previous band or apply the paging configuration broadcast from a camped cell on the previous band.

In some implementations, if the UE is equipped with Multi-SIM, the UE may operate on one band associated to a network (e.g., the Network A) and operate one another band associated to another network (e.g., the Network B). For example, a licensed band associated to the Network A and an unlicensed band associated to the Network B. For another example, a licensed band associated to the Network A and another licensed band associated to the Network B.

In some implementations, a UE may be configured with one or more paging parameters for a cell on an unlicensed band (e.g., an NR-U cell). If the UE reselects a cell on a licensed band no matter the frequency prioritization is, the UE may start a timer and store the paging configuration used for the cell on the unlicensed band. Before the timer expires, if the UE reselects the same cell on an unlicensed band as the previous serving cell on the unlicensed band, the UE may apply the stored paging configuration. Before the timer expires, if the UE reselects a different cell on an unlicensed band from the previous serving cell on the unlicensed band, the UE may stop (or restart) the timer and clear/remove/release the paging configuration.

In some implementations, before the timer expires, if the UE reselects a different cell on an unlicensed band from the previous serving cell on the unlicensed band, the UE may keep the timer running and store the paging configuration.

In some implementations, before the timer expires, if the UE reselects any cell on an unlicensed band, the UE may apply the stored paging configuration associated to the timer. The UE may stop (or restart) the timer when the UE reselects the same cell on the unlicensed band as the previous serving cell on the unlicensed band.

In some implementations, the UE may stop (or restart) the timer when the UE reselects any cell on the unlicensed band. If the timer expires, the UE may release, clear or remove the stored paging configuration associated to the timer. If the timer expires and the UE reselects a cell on the unlicensed band, the UE may use the preconfigured paging configuration for the unlicensed band or apply the broadcast paging configuration from a camped cell on the unlicensed band.

In some implementations, if the UE notifies a network (e.g., the Network A) of a network switch from the network (e.g., the Network A) (where the UE is equipped with Multi-SIM), the UE may send the dedicated signaling (e.g., RRC signaling or NAS signaling) including an indicator to indicate the validity of a paging configuration for the network (e.g., the Network A) before the UE performs the network switch.

In some implementations, if the UE (where the UE is equipped with Multi-SIM) performs the network switch from one network (e.g., the Network A) to another network (e.g., the Network B), the UE may send the dedicated signaling (e.g., RRC signaling or NAS signaling) including an indicator to indicate the validity of a paging configuration for original network (e.g., the Network A), to (the cell of) the target network (e.g., the Network B).

In some implementations, the paging configuration (or the paging configuration associated to a network) may be part of the UE NAS context. The UE may be configured (or update/delete/clear/store/release) the paging configuration (or the paging configuration associated to a network) via the NAS layer of the UE. The signaling exchange between the camped/serving cell of a network and the UE may be RRC signaling including the paging configuration in the form of NAS signaling. The camped/serving cell of the network may further forward the paging configuration in the form of NAS signaling to the CN of the network. The NAS entity of the CN may handle (or update/delete/clear/store/release) the paging configuration for the UE.

In some implementations, if the UE is in the RRC_IDLE state, the UE may handle the paging configuration via the NAS entity of the UE and handle the paging configuration as part of UE NAS context. The UE may apply the paging configuration for CN paging.

In some implementations, the paging configuration (or the paging configuration associated to a network) may be part of the UE AS context. The UE may be configured (or update/delete/clear/store/release) the paging configuration (or the paging configuration associated to a network) via the RRC layer of the UE. The signaling exchange between the camped/serving cell of a network and the UE may be RRC signaling. The RRC entity of the camped/serving cell may handle (or update/delete/clear/store/release) the paging configuration for the UE.

In some implementations, if the UE is in the RRC_INACTIVE state, the UE may handle the paging configuration via the RRC entity of the UE and handle the paging configuration as part of UE AS context. The UE may apply the paging configuration for RAN paging.

In some implementations, the terms "paging," "paging channel," and "PO" may be used interchangeably.

In some implementations, the paging DCI may be carried by PDCCH(s) in a CORESET. In some implementations, the paging DCI may be the PDCCH addressed to the RNTI associated with paging.

In some implementations, the PDCCH(s) addressed to an RNTI associated with paging may include (or be) the DCI format 1_0 with Cyclic Redundancy Check (CRC) scrambled by a P-RNTI.

In some implementations, a PDSCH may carry the paging message.

In some implementations, the RRC_CONNECTED UE, RRC_INACTIVE UE, and RRC_IDLE UE may each apply the operations, actions or procedures described in the proposed implementations.

In some implementations, when the UE monitors the paging channel(s), the UE may further receive the paging (e.g., the PDCCH addressed to an RNTI associated with paging, the paging DCI and/or paging message(s)) in the PO(s).

In some implementations, if the UE monitors the paging channel(s), the UE may further decode the paging (e.g., the PDCCH addressed to an RNTI associated with paging, paging DCI(s), paging message(s)) in the PO (s).

In some implementations, the paging DCI may be the DCI with the CRC scrambled by a P-RNTI or by a common RNTI (e.g., Cell Radio Network Temporary Identifier (C-RNTI)), which indicate the information related to the paging. The information related to the paging may be the time/frequency resource (e.g., PDSCH resources) for the UE to receive the paging message(s). In some implementations, the information related to paging may be the ETWS/CMAS notification and/or system information change.

In some implementations, a DRS window length may be 5 milliseconds (ms), and a DRX cycle may be 32, 64, 128 or 256 radio frames.

In some implementations, the network may provide the system information through dedicated signaling to an RRC_CONNECTED UE using an RRC Reconfiguration message. For example, the RRC_CONNECTED UE may be configured with an active BWP with a common search space configured to monitor the system information or paging.

In some implementations, the PDCCH addressed to an RNTI associated with paging (on which the UE successfully decodes) may indicate the paging information including the UE ID or without the UE ID.

In some implementations, the operations, actions or procedures described in the proposed implementations may be determined based on a per-PLMN basis, a per-NPN basis, a per-SNPN basis, or a per-Closed Access Group (CAG) basis. For example, each UE belonging to a different PLMN/NPN/CAG/SNPN may be configured with different parameter(s) for receiving a PDCCH addressed to an RNTI associated with paging in PO(s) in a DRS/DRX.

In some implementations, a UE may receive the paging (e.g., the PDCCH addressed to an RNTI associated with paging, the paging DCI and/or the paging message(s)) in the initial BWP and/or the active BWP.

In some implementations, the UE may receive an indicator that indicates whether to stop monitoring the paging channel(s). The UE may receive the indicator via system information (e.g., the SIB1 and/or OSI) from a serving/camped cell. The UE may receive the indicator via dedicated signaling (e.g., an RRC message, an RRC Reconfiguration message, an RRC Release message, an RRC Release message without a suspend configuration, or an RRC Release message with a suspend configuration) from a serving/camped cell. In some implementations, the UE may receive the indicator in the PDCCH addressed to an RNTI associated with paging, the paging DCI or the paging message(s). The indicator may have a Boolean structure or an enumerate structure. In some implementations, if the indicator does not instruct the UE to stop monitoring the paging channel(s), the UE may continue to monitor the paging channel(s).

Figure 8:
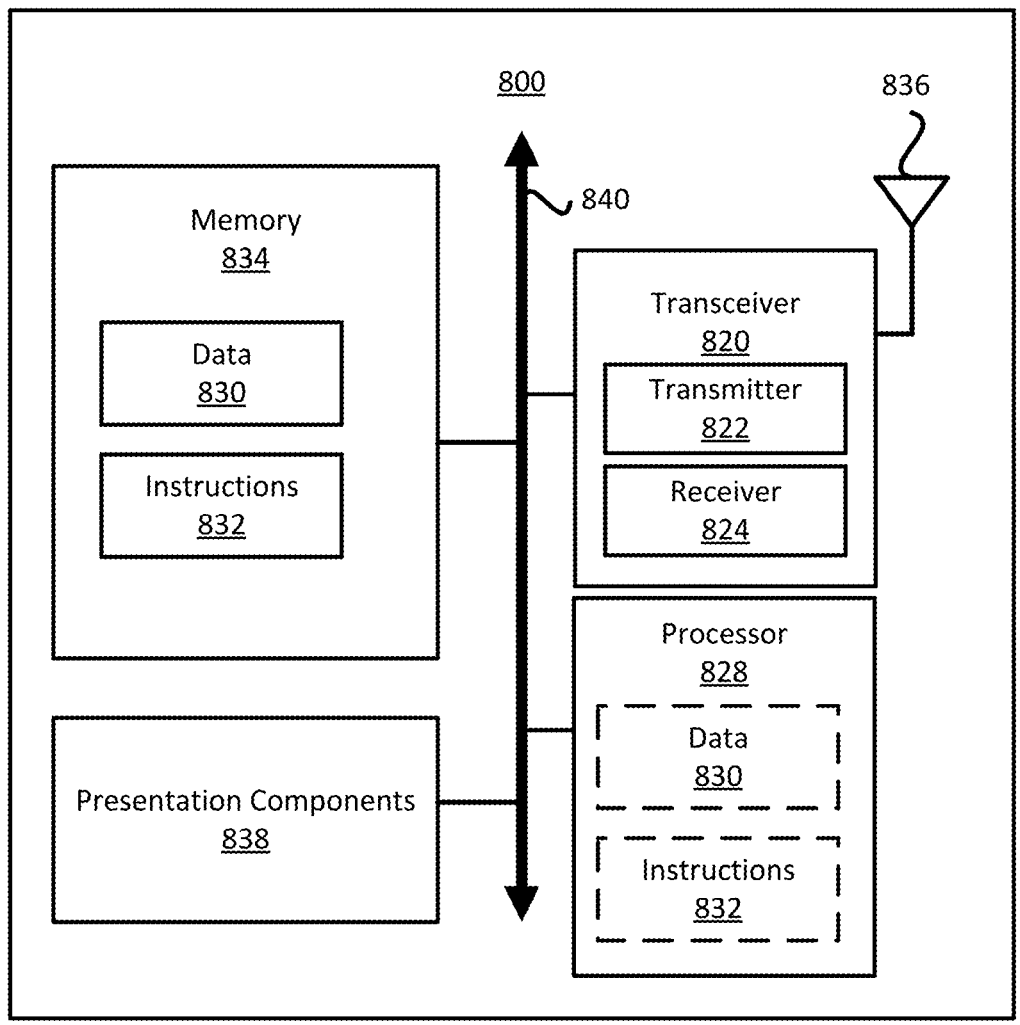
FIG. 8 is a block diagram illustrating a node for wireless communication, in accordance with various aspects of the present application.

FIG. 8 is a block diagram illustrating a node for wireless communication, in accordance with various aspects of the present application. As shown in FIG. 8, a node 800 may include a transceiver 820, a processor 828, a memory 834, one or more presentation components 838, and at least one antenna 836. The node 800 may also include an RF spectrum band module, a BS communications module, a network communications module, and a system communications management module, Input/Output (I/O) ports, I/O components, and power supply (not explicitly shown in FIG. 8). Each of these components may be in communication with each other, directly or indirectly, over one or more buses 840. In one implementation, the node 800 may be a UE or a BS, or any other apparatus of wireless communications that performs various functions described herein, for example, with reference to FIGS. 1 through 7.

The transceiver 820 having a transmitter 822 (e.g., transmitting/transmission circuitry) and a receiver 824 (e.g., receiving/reception circuitry) may be configured to transmit and/or receive time and/or frequency resource partitioning information. In some implementations, the transceiver 820 may be configured to transmit in different types of subframes and slots including, but are not limited to, usable, non-usable and flexibly usable subframes and slot formats. The transceiver 820 may be configured to receive data and control channels.

The node 800 may include a variety of computer-readable media. Computer-readable media may be any available media that may be accessed by the node 800 and include both volatile and non-volatile media, removable and non-removable media. By way of example, and not limitation, computer-readable media may comprise computer storage media and communication media. Computer storage media include both volatile and non-volatile, removable and non-removable media implemented in any method or technology for storage of information such as computer-readable instructions, data structures, program modules or data.

Computer storage media include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not comprise a propagated data signal. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

The memory 834 may include computer-storage media in the form of volatile and/or non-volatile memory. The memory 834 may be removable, non-removable, or a combination thereof. Examples of memory includes solid-state memory, hard drives, optical-disc drives, etc. As illustrated in FIG. 8, the memory 834 may store computer-readable, computer-executable instructions 832 (e.g., software codes) that are configured to, when executed, cause the processor 828 to perform various functions described herein, for example, with reference to FIGS. 1 through 7. Alternatively, the instructions 832 may not be directly executable by the processor 828 but be configured to cause the node 800 (e.g., when compiled and executed) to perform various functions described herein.

The processor 828 (e.g., having processing circuitry) may include a Central Processing Unit (CPU), a microcontroller, an ASIC, an intelligent hardware device, or any combination thereof configured to perform the functions described herein. The processor 828 may include memory. The processor 828 may process the data 830 and the instructions 832 received from the memory 834, and information through the transceiver 820, the base band communications module, and/or the network communications module. The processor 828 may also process information to be sent to the transceiver 820 for transmission through the antenna 836, to the network communications module for transmission to a CN.

One or more presentation components 838 may present data indications to a person or other devices. Examples of presentation components 838 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A user equipment (UE) for paging monitoring, the UE comprising:
   one or more non-transitory computer-readable media storing computer-executable instructions; and
   at least one processor coupled to the one or more non-transitory computer-readable media, and configured to execute the computer-executable instructions to:
      receive a first paging configuration associated with a first Radio Access Network (RAN) from the first RAN;
      receive a second paging configuration associated with a second RAN from the first RAN;
      monitor at least one first paging occasion for the first RAN based on the first paging configuration received from the first RAN;
      monitor at least one second paging occasion for the second RAN based on the second paging configuration received from the first RAN when the UE switches from a first cell of the first RAN to camp on a second cell of the second RAN; and
      perform at least one updating procedure comprising one of:
         updating the second paging configuration based on first dedicated signaling received from the second cell of the second RAN, or based on first system information received from the second cell of the second RAN, after the UE switches to camp on the second cell of the second RAN;
         updating the second paging configuration based on second dedicated signaling received from the first cell of the first RAN, or based on second system information received from the first cell of the first RAN, before the UE switches to camp on the second cell of the second RAN; and
         updating the first paging configuration based on third dedicated signaling received from the second cell of the second RAN, or based on third system information received from the second cell of the second RAN, after the UE switches to camp on the second cell of the second RAN.

2. The UE of claim 1, wherein the at least one processor is further configured to execute the computer-executable instructions to:
   transmit a paging collision indicator to the second cell of the second RAN when the UE detects a paging collision in the second RAN; and
   receive, in the first dedicated signaling from the second cell of the second RAN, information for updating the second paging configuration after transmitting the paging collision indicator to the second cell of the second RAN.

3. The UE of claim 1, wherein the at least one processor is further configured to execute the computer-executable instructions to:
   receive, from the first cell of the first RAN, Radio Resource Configuration (RRC) state transition information for the UE to perform an RRC state transition; and
   perform the RRC state transition based on the RRC state transition information to transition from a first RRC state of the first RAN to a second RRC state of the second RAN.

4. The UE of claim 3, wherein the second paging configuration is for the UE to apply in the second RRC state of the second RAN to monitor the at least one second paging occasion for the second RAN.

5. The UE of claim 3, wherein the second RRC state is one of an RRC_IDLE state of the second RAN and an RRC_INACTIVE state of the second RAN.

6. The UE of claim 1, wherein the at least one processor is further configured to execute the computer-executable instructions to:
   release the first paging configuration when the UE switches to camp on the second cell of the second RAN.

7. The UE of claim 6, wherein the at least one processor is further configured to execute the computer-executable instructions to:
   transmit an indicator to the first cell of the first RAN to indicate that the first paging configuration is released.

8. The UE of claim 1, wherein the second paging configuration includes at least one of:

at least one parameter for the UE to derive locations of radio resources, based on which the UE monitors the at least one second paging occasion for the second RAN, at least one parameter for activating a paging monitoring procedure in the second RAN, and at least one parameter for inactivating the paging monitoring procedure in the second RAN.

9. The UE of claim 1, wherein the at least one processor is further configured to execute the computer-executable instructions to:

obtain a third paging configuration associated with a third RAN from a Universal Mobile Telecommunication System Subscriber Identity Module (USIM) of the UE; and monitor at least one third paging occasion for the third RAN based on the third paging configuration when the UE is operating in the third RAN.

10. The UE of claim 1, wherein the UE is adapted to be equipped with at least two Universal Mobile Telecommunication System Subscriber Identity Modules (USIMs).

11. A method performed by a user equipment (UE) for paging monitoring, the method comprising:

receiving a first paging configuration associated with a first Radio Access Network (RAN) from the first RAN;

receiving a second paging configuration associated with a second RAN from the first RAN;

monitoring at least one first paging occasion for the first RAN based on the first paging configuration received from the first RAN;

monitoring at least one second paging occasion for the second RAN based on the second paging configuration received from the first RAN when the UE switches from a first cell of the first RAN to camp on a second cell of the second RAN; and performing at least one updating procedure comprising one of:

updating the second paging configuration based on first dedicated signaling received from the second cell of the second RAN, or based on first system information received from the second cell of the second RAN, after the UE switches to camp on the second cell of the second RAN;

updating the second paging configuration based on second dedicated signaling received from the first cell of the first RAN, or based on second system information received from the first cell of the first RAN, before the UE switches to camp on the second cell of the second RAN; and updating the first paging configuration based on third dedicated signaling received from the second cell of the second RAN, or based on third system information received from the second cell of the second RAN, after the UE switches to camp on the second cell of the second RAN.

12. The method of claim 11, further comprising:

transmitting a paging collision indicator to the second cell of the second RAN when the UE detects a paging collision in the second RAN; and receiving, in the first dedicated signaling from the second cell of the second RAN, information for updating the second paging configuration after transmitting the paging collision indicator to the second cell of the second RAN.

13. The method of claim 11, further comprising:

receiving, from the first cell of the first RAN, Radio Resource Configuration (RRC) state transition information for the UE to perform an RRC state transition; and performing the RRC state transition based on the RRC state transition information to transition from a first RRC state of the first RAN to a second RRC state of the second RAN.

14. The method of claim 13, wherein the second paging configuration is for the UE to apply in the second RRC state of the second RAN to monitor the at least one second paging occasion for the second RAN.

15. The method of claim 13, wherein the second RRC state is one of an RRC_IDLE state of the second RAN and an RRC_INACTIVE state of the second RAN.

16. The method of claim 11, further comprising:

releasing the first paging configuration when the UE switches to camp on the second cell of the second RAN.

17. The method of claim 16, further comprising:

transmitting an indicator to the first cell of the first RAN to indicate that the first paging configuration is released.

18. The method of claim 11, wherein the second paging configuration includes at least one of:

at least one parameter for the UE to derive locations of radio resources, based on which the UE monitors the at least one second paging occasion for the second RAN, at least one parameter for activating a paging monitoring procedure in the second RAN, and at least one parameter for inactivating the paging monitoring procedure in the second RAN.

19. The method of claim 11, further comprising:

obtaining a third paging configuration associated with a third RAN from a Universal Mobile Telecommunication System Subscriber Identity Module (USIM) of the UE; and monitoring at least one third paging occasion for the third RAN based on the third paging configuration when the UE is operating in the third RAN.

20. The method of claim 11, wherein the UE is adapted to be equipped with at least two Universal Mobile Telecommunication System Subscriber Identity Modules (USIMs).

* * * * *